US008265478B1

(12) United States Patent
Georgiev

(10) Patent No.: US 8,265,478 B1
(45) Date of Patent: *Sep. 11, 2012

(54) PLENOPTIC CAMERA WITH LARGE DEPTH OF FIELD

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,877

(22) Filed: May 9, 2011

Related U.S. Application Data

(63) Continuation of application No. 12/636,168, filed on Dec. 11, 2009, now Pat. No. 7,949,252.

(60) Provisional application No. 61/121,846, filed on Dec. 11, 2008.

(51) Int. Cl.
*G03B 41/00* (2006.01)
(52) U.S. Cl. ........................................ 396/334; 348/340
(58) Field of Classification Search .................. 396/322, 396/334; 348/340
See application file for complete search history.

(56) References Cited

U.S. PATENT DOCUMENTS

| 725,567 | A | 4/1903 | Ives |
|---|---|---|---|
| 2,039,648 | A | 5/1936 | Ives et al. |
| 3,985,419 | A | 10/1976 | Matsumoto et al. |
| 4,180,313 | A | 12/1979 | Inuiya |
| 4,193,093 | A | 3/1980 | St. Clair |
| 4,732,453 | A | 3/1988 | de Montebello et al. |
| 4,849,782 | A | 7/1989 | Koyama et al. |
| 5,076,687 | A | 12/1991 | Adelson |
| 5,361,127 | A | 11/1994 | Dailey |
| 5,400,093 | A | 3/1995 | Timmers |
| 5,659,420 | A | 8/1997 | Wakai et al. |
| 5,729,011 | A | 3/1998 | Sekiguchi |
| 5,946,077 | A | 8/1999 | Nemirovskiy |
| 6,137,937 | A | 10/2000 | Okano et al. |
| 6,268,846 | B1 | 7/2001 | Georgiev |

(Continued)

FOREIGN PATENT DOCUMENTS

EP 1548481 6/2005

(Continued)

OTHER PUBLICATIONS

Adelson, T., et al., "Single Lens Stereo with a Plenoptic Camera," IEEE Transactions on Pattern Analysis and machine Intelligence 14, 2, Feb. 1992, pp. 99-106.

(Continued)

*Primary Examiner* — Clayton E LaBalle
*Assistant Examiner* — Leon W Rhodes, Jr.
(74) *Attorney, Agent, or Firm* — Robert C. Kowert; Meyertons, Hood, Kivlin, Kowert & Goetzel, P.C.

(57) ABSTRACT

Methods and apparatus for light-field capture with large depth of field. A design methodology is described in which the relationships among various plenoptic camera parameters, including inverse magnification, F-number, focal length, wavelength, and pixel size, may be analyzed to design plenoptic cameras that provide increased depth-of-field when compared to conventional plenoptic cameras. Plenoptic cameras are described, which may be implemented according to the design methodology, and in which both Keplerian telescopic and Galilean telescopic imaging can be realized at the same time while providing a larger depth of field than is realized in conventional plenoptic cameras, thus capturing light-field images that capture "both sides" in which all but a small region of the scene is in focus. In some embodiments, apertures may be added to the microlenses so that depth of field is increased.

21 Claims, 15 Drawing Sheets

U.S. PATENT DOCUMENTS

| | | | |
|---|---|---|---|
| 6,301,416 B1 | 10/2001 | Okano et al. | |
| 6,339,506 B1 | 1/2002 | Wakelin et al. | |
| 6,351,269 B1 | 2/2002 | Georgiev | |
| 6,476,805 B1 | 11/2002 | Shum et al. | |
| 6,738,533 B1 | 5/2004 | Shum et al. | |
| 6,838,650 B1 | 1/2005 | Toh | |
| 7,054,067 B2 | 5/2006 | Okano et al. | |
| 7,620,309 B2 | 11/2009 | Georgiev | |
| 2001/0012149 A1 | 8/2001 | Lin et al. | |
| 2001/0050813 A1 | 12/2001 | Allio | |
| 2002/0140835 A1 | 10/2002 | Silverstein | |
| 2003/0231255 A1 | 12/2003 | Szajewski et al. | |
| 2004/0114807 A1 | 6/2004 | Lelescu et al. | |
| 2004/0223214 A1 | 11/2004 | Atkinson | |
| 2005/0088714 A1 | 4/2005 | Kremen | |
| 2005/0122418 A1 | 6/2005 | Okita et al. | |
| 2008/0165270 A1 | 7/2008 | Watanabe et al. | |
| 2009/0041381 A1 | 2/2009 | Georgiev | |
| 2009/0041448 A1 | 2/2009 | Georgiev | |
| 2009/0140131 A1 | 6/2009 | Utagawa | |
| 2009/0185801 A1 | 7/2009 | Georgiev et al. | |
| 2010/0085468 A1 | 4/2010 | Park et al. | |

FOREIGN PATENT DOCUMENTS

| | | |
|---|---|---|
| WO | 01/37025 | 5/2001 |
| WO | 2006/057838 | 6/2006 |
| WO | 2007/115281 | 10/2007 |

OTHER PUBLICATIONS

Ng, R., et al., "Light Field Photography with a Hand-Held Plenoptic Camera," Stanford Univ. Computer Science Tech Report CSTR 2005-02, Apr. 2005.

le;2qU.S. Appl. No. 12/271,389, filed on Nov. 14, 2008.

le;2qAdelson, T., and Wang, J., "Single lens stereo with a plenoptic camera," IEEE Transactions on Pattern Analysis and Machine Intelligence, vol. 14, issue 2, 99-106, 1992.

le;2qBorman, S., and Stevenson, R., "Super-resolution from image sequences—a review", Proceedings of the 1998 Midwest Symposium on Circuits and Systems, Publication Date: Aug. 9-12, 1998, on pp. 374-378.

le;2qElad, M., and Feuer, A., "Restoration of a single superresolution image from several blurred, noisy, and undersampled measured images," IEEE Transactions on Image Processing Dec. 1997.

le;2qFarsiu, S., Robinson, D., Elad, M., and Milanfar, P., "Advances and challenges in super-resolution," International Journal of Imaging Systems and Technology, 2004.

le;2qGeorgiev, T., Zheng, K., Curless, B., Salesin, D., and et al., "Spatio-angular resolution tradeoff in integral photography," Proc. Eurographics Symposium on Rendering, 2006.

le;2qGortler, S. J., Grzeszczuk, R., Szeliski, R., and Cohen, M. F., "The lumigraph," ACM Trans. Graph., 43-54, 1996.

le;2qIsaksen, A., McMillan, L., and Gortler, S. J., "Dynamically reparameterized light fields," ACM Trans. Graph., 297-306, 2000.

le;2qLevoy, M., and Hanrahan, P., Light field rendering, ACM Trans. Graph., 31-42, 1996.

le;2qNg, R., Levoy, M., Brdif, M., Duval, G., Horowitz, M., and Hanrahan, P., "Light field photography with a hand-held plenoptic camera," 2005.

le;2qNg, R., "Fourier slice photography," International Conference on Computer Graphics and Interactive Techniques Proceedings of ACM SIGGRAPH 2005.

le;2qPark, S., Park, M., and Kang, M., "Super-resolution image reconstruction: a technical overview," Signal Processing Magazine, 2003.

le;2qVeeraraghavan, A., Mohan, A., Agrawal, A., Raskar, R., and Tumblin, J., "Dappled photography: Mask enhanced cameras for heterodyned light fields and coded aperture refocusing," ACM Trans. Graph. 26, 3, 69, 2007.

le;2qU.S. Appl. No. 12/503,803, filed on Jul. 15, 2009.

le;2qU.S. Appl. No. 12/628,437, filed on Dec. 1, 2009.

le;2qFife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

le;2qLumsdaine A., Georgiev T.: Full Resolution Lightfield Rendering. Tech. rep., Adobe Systems, Jan. 2008.

le;2qZhang, et al., "A Survey on Image-based Rendering-Representation, Sampling and Compression," Signal Processing, Image Communication, Elsevier Science Publishers, vol. 19, No. 1, Jan. 1, 2004, 28 pages.

le;2qBrown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

le;2qHeung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

le;2qGeorgiev T., Wainer M.: "Morphing Between Multiple Images," Tech. Rep. (1997).

le;2qShing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

le;2qXiao J., Shah M.: "Tri-view Morphing," Computer Vision and Image Understanding 96, 3 (2004), 345-366.

le;2qLippmann G.: "Epreuves reversible donnant la sensation du relief ("Reversible Prints Providing the Sensation of Depth")", Journal of Physics 7 (1908), pp. 821-825.

le;2qLippmann G.: "Epreuves Reversibles Photographies Integrales," Academie des sciences (Mar. 1908), pp. 446-451.

le;2qLee S., Wolberg G., Shin S.: "Polymorph: Morphing Among Multiple Images," IEEE Computer Graphics and Applications (1998).

le;2qZaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

le;2qUlrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

le;2qNaemura T., Yoshida T., Harashima H.: "3d Computer Graphics Based on Integral Photography," Optics Express, vol. 8, 2 (2001).

le;2qZitnick C. L., Jojic N., Kang S.: "Consistent Segmentation for Optical Flow Estimation" In Proceedings of IEEE International Conference on Computer Vision (ICCV) (2005).

le;2qSeitz S. M., Dyer C. R.: "View Morphing," ACM Trans. Graph. (1996), 21-30.

le;2qStevens R., Harvey T.: "Lens Arrays for a Three-dimensional Imaging System," Journal of Optics A, vol. 4 (2002).

le;2qStewart J., Yu J., Gortler S. J., McMillan L.: "A New Reconstruction Filter for Undersampled Light Field," Eurographics Symposium on Rendering (2003), 150-156.

le;2qVaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).

le;2qWilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).

le;2qU.S. Appl. No. 12/574,183, filed Oct. 6, 2009.

le;2qU.S. Appl. No. 12/144,411, filed Jun. 23, 2008.

le;2qU.S. Appl. No. 12/186,396, filed Jun. 23, 2008.

le;2qU.S. Appl. No. 11/874,611, filed Oct. 18, 2007.

le;2qU.S. Appl. No. 11/627,141, filed Jan. 25, 2007.

le;2qU.S. Appl. No. 12/790,677, filed May 28, 2010.

le;2qU.S. Appl. No. 12/474,112, filed May 28, 2009.

le;2qU.S. Appl. No. 12/130,725, filed May 30, 2008.

le;2qU.S. Appl. No. 12/111,735, filed Apr. 29, 2008.

le;2qU.S. Appl. No. 12/690,569, filed Jan. 20, 2010.

le;2qU.S. Appl. No. 12/690,871, filed Jan. 20, 2010.

PLENOPTIC CAMERA WITH LARGE DEPTH OF FIELD

PRIORITY INFORMATION

This application is a Continuation of U.S. patent application Ser. No. 12/636,168, filed on Dec. 11, 2009 now U.S. Pat. No. 7,949,252, which claims benefit of priority of U.S. Provisional Application Ser. No. 61/121,846, filed Dec. 11, 2008, the contents of which are incorporated by reference herein in their entirety.

BACKGROUND

Description of Related Art

In a conventional camera, the main lens maps the 3D world of the scene outside camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings—it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and ∞ (infinity) inside the camera, the sensor captures an in-focus image of the corresponding plane at A that was mapped from the scene in front of the lens.

Conventional cameras render a three-dimensional scene onto a two-dimensional sensor. During operation, a conventional digital camera captures a two-dimensional (2-D) image representing a total amount of light that strikes each point on a photosensor within the camera. However, this 2-D image contains no information about the direction of the light that strikes the photosensor. The image captured by a conventional camera essentially integrates the radiance function over its angular portion, resulting in a two-dimensional intensity as a function of position. The angular information of the original radiance is lost. Thus, conventional cameras fail to capture a large amount of optical information.

Light-Field or Radiance Capturing Cameras

In contrast to conventional cameras, light-field, or radiance capturing, cameras sample the four-dimensional (4-D) optical phase space, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Radiance may be captured with a conventional camera. In one conventional method, M×N images of a scene may be captured from different positions with a conventional camera. If, for example, 8×8 images are captured from 64 different positions, 64 images are produced. The pixel from each position (i, j) in each image are taken and placed into blocks, to generate 64 blocks. FIG. 2 illustrates an example prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 3 illustrates an example prior art plenoptic camera, another type of radiance capturing camera, that employs a single objective lens and a microlens or lenslet array 106 that includes, for example, about 100,000 lenslets. In a conventional plenoptic camera 102, lenslet array 106 is fixed at a small distance (~0.5 mm) from a photosensor 108, e.g. a charge-coupled device (CCD). In conventional plenoptic cameras, the microlenses are placed and adjusted accurately to be exactly at one focal length f from the sensor 108. This is done by placing the array of microlenses at distance f from the sensor, where f is the focal length of the microlenses. Another way to say this is that, for the microlenses, f is chosen to be equal to the distance to the photosensor 108. In other words, the microlenses are focused on infinity, which is essentially equivalent to focusing the microlenses on the main lens 104, given the large distance of the microlenses to the main lens relative to the focal length of the microlenses. Thus, the raw image captured with plenoptic camera 102 is made up of an array of small images, typically circular, of the main lens 108. These small images may be referred to as microimages. However, in conventional plenoptic camera 102, each microlens does not create an image of the internal world on the sensor 108, but instead creates an image of the main camera lens 104.

The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field camera is similar to the plenoptic camera of FIG. 3, except that an array of pinholes is used between the main lens and the photosensor instead of an array of lenslets.

FIG. 4 further illustrates an example prior art plenoptic camera model. In conventional plenoptic camera 102, the microlens-space system swaps positional and angular coordinates of the radiance at the microlens. For clarity, only the rays through one of the microlenses are illustrated. The conventional optical analysis of such a plenoptic camera considers it as a cascade of a main lens system followed by a microlens system. The basic operation of the cascade system is as follows. Rays focused by the main lens 104 are separated by the microlenses 106 and captured on the sensor 108. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the sensor 108. Because of the swap, it represents the angular information at the microlens. As a result, each microlens image captured by sensor 108 represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as flat or light-field representation of the 4D radiance.

To accommodate the extra degrees of dimensionality, extremely high sensor resolution is required to capture flat representation of the radiance. Even so, images are rendered from a flat at a much lower resolution than that of the sensor, i.e., at the resolution of the radiance's positional coordinates. If the angular information is finely sampled, then a large number of pixels from the flat light-field imagery are being used to create just one pixel in the rendered image. Each microlens determines only one pixel in the rendered image; when the angular information under one microlens is integrated, only one pixel is determined in the rendered image. The rendered image may thus have a resolution that is orders of magnitude smaller than the raw flat light-field imagery itself. For example, in an example conventional light-field camera, a "flat" may be represented in 2D with a 24,862×21,818 pixel array. The 4D radiance that is represented may, for example, be 408×358×61×61. With existing rendering techniques, images are rendered from this radiance at 408×358, i.e., 0.146 megapixel. Not only is this a disappointingly modest resolution (any cell phone today will have better resolution), any particular rendered view only uses one out of every 3,720 pixels from the flat imagery. The large disparity between the resolution of the flat and the rendered images is extraordinarily wasteful for photographers who are ultimately interested in taking photographs rather than capturing flat representations of the radiance.

Depending on whether a main lens image plane is in front or behind the microlenses, a plenoptic camera may work respectively as an array of Keplerian telescopes (Keplerian telescopic case) or Galilean telescopes (Galilean telescopic case). However, conventional plenoptic camera designs, as illustrated in FIGS. 3 and 4, tend to have a limited depth of field. For example, in a conventional plenoptic camera using inverse magnification M=14 and F=4, within about 7 mm of the microlens array there is a zone of poor focus. This relatively large zone of poor focus around the microlenses limits what can be captured by the conventional plenoptic camera with acceptable focusing to the regions outsize this zone. Furthermore, because of this limited depth of field, it is impractical for conventional plenoptic cameras to realize both Keplerian telescopic and Galilean telescopic imaging at the same time (that is, to capture a single image of a scene using both modes), since a large region of the scene would be out-of-focus.

SUMMARY

Various embodiments of plenoptic cameras with large depth of field are described. Depending on whether the main lens image is in front or behind the microlenses, a plenoptic camera works respectively as an array of Keplerian telescopes (Keplerian telescopic case) or Galilean telescopes (Galilean telescopic case). However, conventional plenoptic camera designs tend to have a limited depth of field. For example, in a conventional plenoptic camera using inverse magnification M=14 and F=4, within about 7 mm of the microlens array there is a zone of poor focus. Because of this limited depth of field, it is impractical for conventional plenoptic cameras to realize both Keplerian telescopic and Galilean telescopic imaging at the same time (that is, to capture a single image of a scene using both modes), since a large region of the scene would be out-of-focus.

A design methodology is described in which the relationships among various plenoptic camera parameters, including inverse magnification, F-number, focal length, wavelength, and pixel size, may be analyzed to design plenoptic cameras that provide increased depth-of-field when compared to conventional plenoptic cameras. Using this design methodology, it is possible to design plenoptic cameras with increased depth of field, and with which both Keplerian telescopic and Galilean telescopic imaging can be realized at the same time.

Embodiments of a plenoptic camera are described, which may be implemented according to the design methodology, and in which both Keplerian telescopic and Galilean telescopic imaging can be realized at the same time while providing a larger depth of field than is realized in conventional plenoptic cameras, thus capturing light-field images that capture "both sides" in which all but a small region of the scene is in focus. In some embodiments, apertures may be added to the microlenses so that depth of field is increased. In an example embodiment, the inverse magnification (M) may be 3, and F-number (F) of the microlenses may be 18. Using these example settings, everything not within a 1.5 mm zone of poor focus around the microlenses is in focus. Embodiments of a plenoptic camera so implemented work at the same time in both Keplerian telescopic and Galilean telescopic modes. With a goal of "refocusability" of captured light-field images in mind, everything is fully refocusable using these embodiments of a plenoptic camera, except for a small (e.g., 1.5 mm) zone of poor focus around the microlenses.

Multiplicity may be defined as the number of times a world point is seen in different microimages. With a goal of achieving lower multiplicity and many pixels in individual microimages in mind, bigger pixels may be needed. Contrary to common intuition, small pixels are not a good solution to produce larger depth of field. Smaller pixels require larger aperture in order to minimize diffraction, and larger aperture results in shallower depth of field. Thus, a solution to achieve microimages of many pixels is to make those pixels larger when compared to the wavelength. For example, if pixel size is $p=10\mu$, and $\lambda=0.5\mu$, then the number of pixels in a microimage $(N)=20$. Thus, an example plenoptic camera may use the example focal length, $f=400\mu$, (at $M=2$), and apertures on the microlenses of $D=20\mu$. Note that the focal length and apertures may be different at different pixel sizes and/or wavelengths.

As described above, embodiments of a plenoptic camera may thus be implemented according to the design methodology to achieve larger depth of field than conventional plenoptic cameras. For practical reasons, in addition to large depth of field, such a plenoptic camera may need to have reasonable sensitivity to light (speed). Thus, in some embodiments, microlens apertures of about 2 times lower ("faster") F-number, e.g. $F=10$, may be used, instead of a theoretically derived optimum of e.g. $F=18$.

Figure 1:
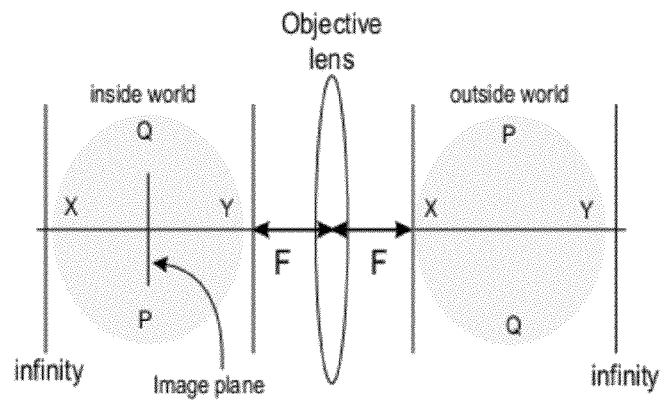
FIG. 1 illustrates imaging in a conventional camera.
Figure 2:
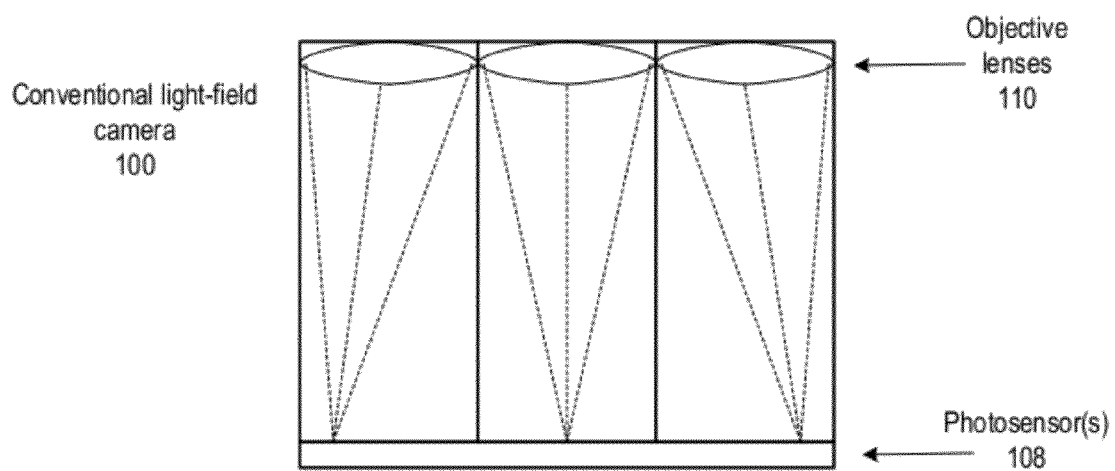
FIG. 2 illustrates an example prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of plenoptic cameras with large depth of field are described. Depending on whether the main lens image is in front or behind the microlenses, a plenoptic camera works respectively as an array of Keplerian telescopes (Keplerian telescopic case) or Galilean telescopes (Galilean telescopic case). However, conventional plenoptic camera designs tend to have a limited depth of field. For example, in a conventional plenoptic camera using inverse magnification M=14 and F=4, within about 7 mm of the microlens array there is a zone of poor focus. Because of this limited depth of field, it is impractical for conventional plenoptic cameras to realize both Keplerian telescopic and Galilean telescopic imaging at the same time (that is, to capture a single image of a scene using both modes), since a large region of the scene would be out-of-focus.

A design methodology is described in which the relationships among various plenoptic camera parameters, including inverse magnification, F-number, focal length, wavelength, and pixel size, may be analyzed to design plenoptic cameras that provide increased depth-of-field when compared to conventional plenoptic cameras. Using this design methodology, it is possible to design plenoptic cameras with increased depth of field, and with which both Keplerian telescopic and Galilean telescopic imaging can be realized at the same time. Embodiments of a plenoptic camera are described, implemented according to the design methodology, in which both Keplerian telescopic and Galilean telescopic imaging can be realized at the same time while providing a much greater depth of field than is realized in conventional plenoptic cameras, thus capturing light-field images that capture "both sides" in which all but a small region of the scene is in focus. In some embodiments, apertures may be added to the microlenses so that depth of field is increased. In addition, a light-field rendering method is described that may be used to render light-field images captured using embodiments of the plenoptic camera.

The parameters of the plenoptic camera, or more generally of imaging devices, are analyzed for the purpose of achieving optimal focusing and depth of field for 3D imaging in plenoptic cameras. Many algorithms used in processing images captured using plenoptic cameras require focused microlens images. The range of applicability of these algorithms therefore depends on the depth of field of the relay system constituting the plenoptic camera. An analysis of the relationships and tradeoffs between plenoptic camera parameters and depth of field is provided, and conditions for optimal refocusing, stereo, and 3D imaging are presented. Based on this analysis, ranges of settings for plenoptic camera parameters may be derived via which depth of field of the plenoptic camera is increased, and via which both Keplerian telescopic and Galilean telescopic imaging can be realized at the same time. Experimental results demonstrate that the plenoptic camera parameter settings as described herein work in practice to generate a much larger depth of field than is achieved with conventional plenoptic cameras. The analysis may be used as the basis for a design methodology for plenoptic cameras.

Figure 9:
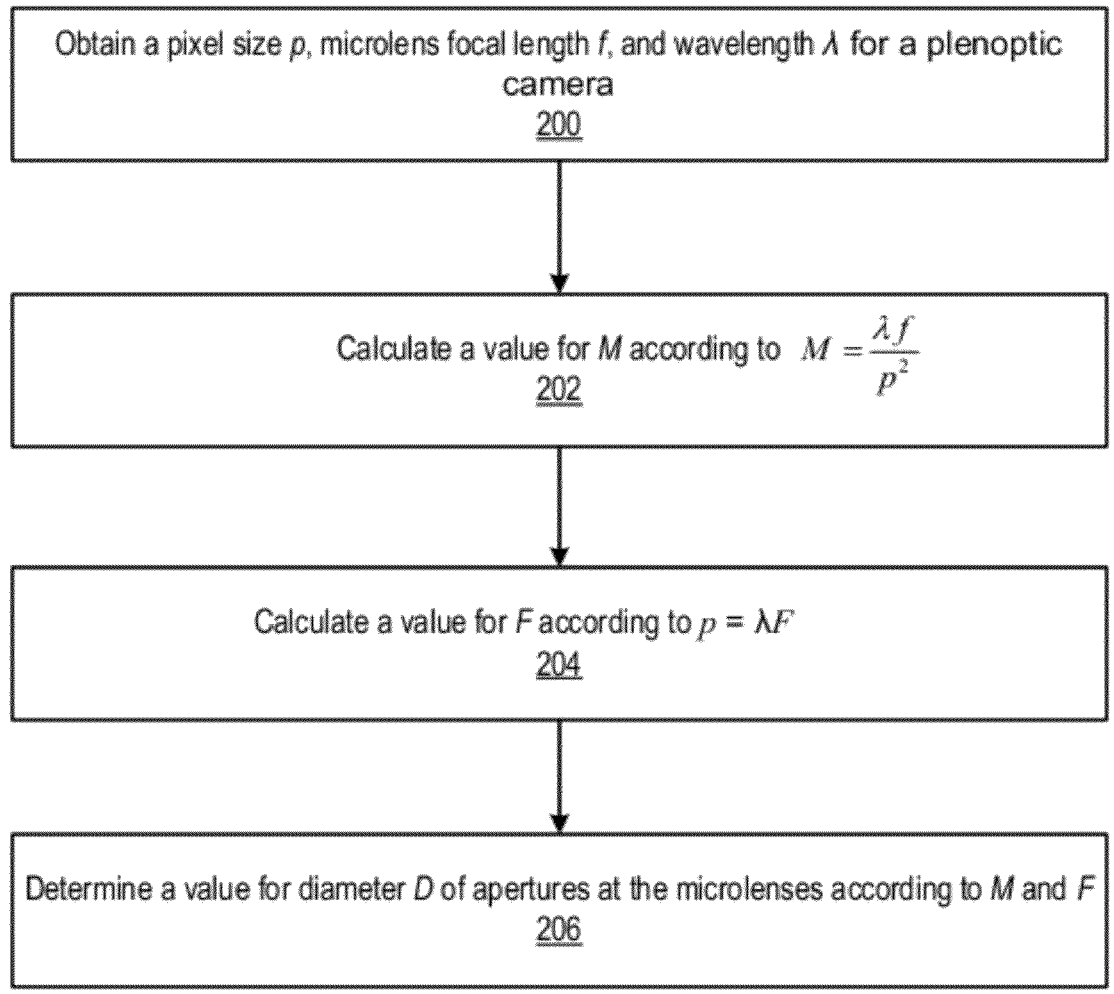
FIG. 9 is a flowchart of an example design method for designing such plenoptic cameras with large depth of field, according to some embodiments.
Figure 19:
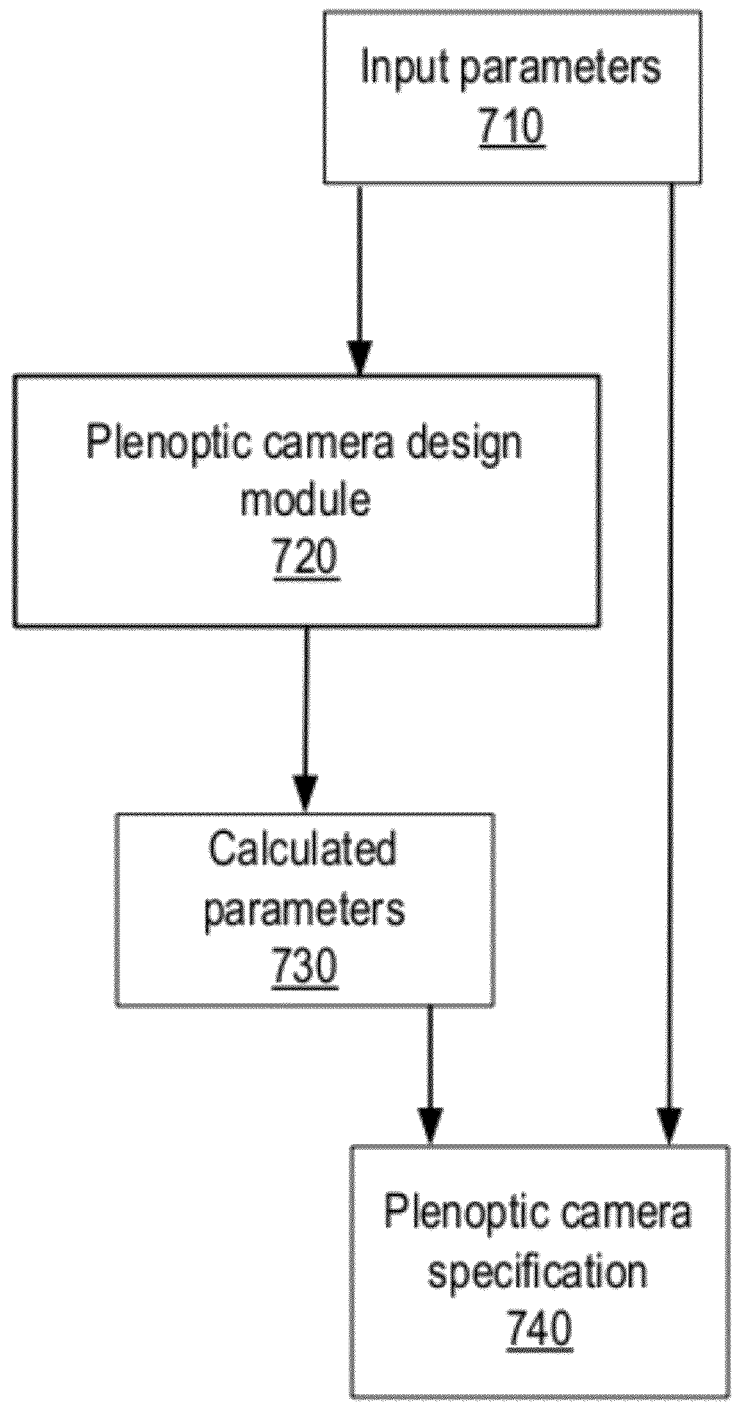
FIG. 19 illustrates a module for designing plenoptic cameras with large depth of field, according to some embodiments.
Figure 21:
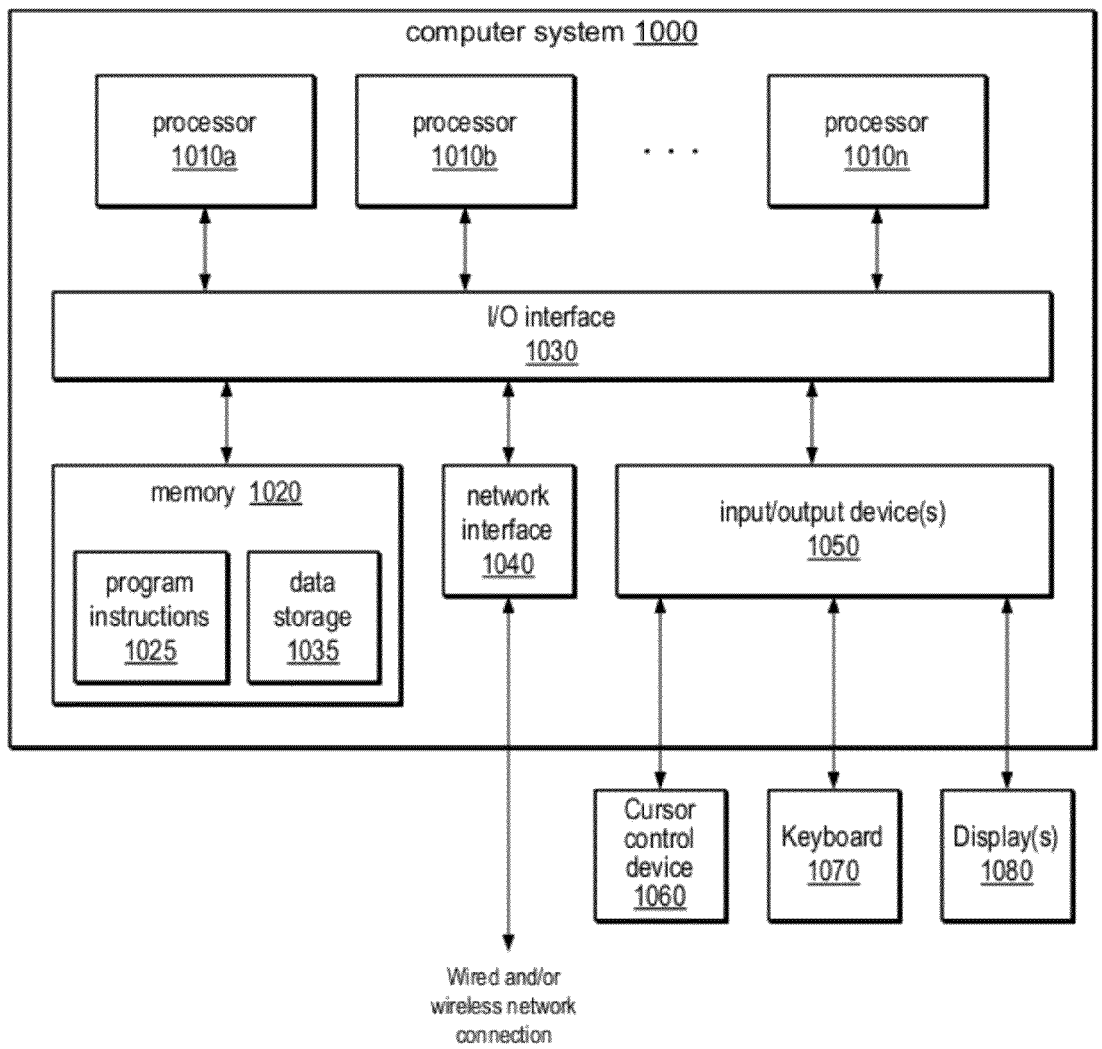
FIG. 21 illustrates an example computer system that may be used in embodiments.

Based on the analysis of the relationships and tradeoffs between the various plenoptic camera parameters and depth of field, a design methodology may be implemented in software via which various parameters for plenoptic cameras can be entered, other parameters may be calculated based on the entered values, and the values of the parameters may be automatically or manually adjusted to design plenoptic cameras with appropriate settings for the parameters so that depth of field is increased and both Keplerian telescopic and Galilean telescopic imaging can be realized. FIG. 9 is a flowchart of an example design method for designing such plenoptic cameras with large depth of field, according to some embodiments. FIG. 19 illustrates an example module that may implement the design methodology as described herein. FIG. 21 illustrates an example system on which such software may be executed.

Figure 3:
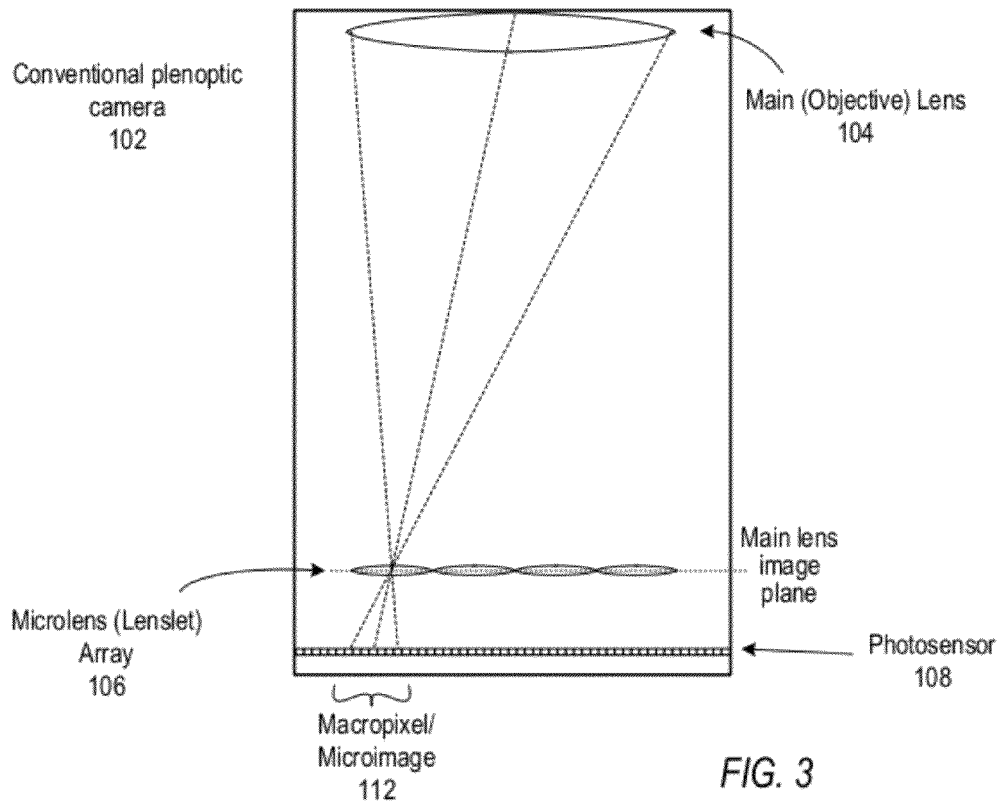
FIG. 3 illustrates an example prior art plenoptic camera that employs a single objective lens and a microlens array.
Figure 4:
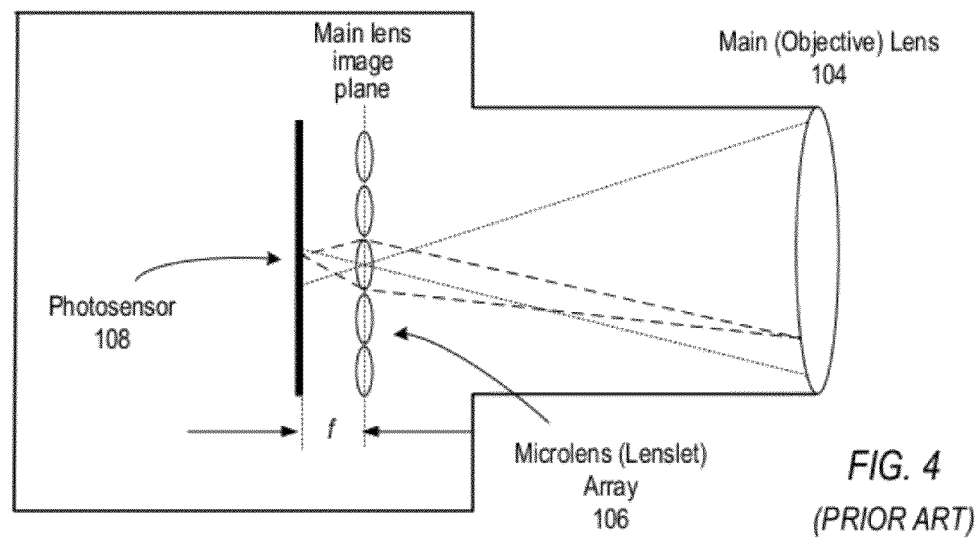
FIG. 4 further illustrates an example prior art plenoptic camera.

In embodiments of a plenoptic camera implemented according to the design methodology, the microlenses may capture portions of the 3D image created "in air" by the main camera lens, with larger depth of field than in conventional plenoptic cameras. Each microlens works together with the main lens as a relay system, forming on the sensor a true image of part of the photographed object. The 3D image created by the main lens may extend both in front of and behind the microlenses. Embodiments of the plenoptic camera as described herein work both as an array of Galilean telescopes (Galilean telescopic, or binocular, case) and Keplerian telescopes (Keplerian telescopic case) to capture portions of the 3D image in both modes, from both sides of the microlenses, at the same time and in the same light-field image. The large depth of field provided by embodiments of the plenoptic camera allow the microimages to be captured in-focus, except for a relatively small region of the 3D image around the microlenses. In addition, embodiments of a plenoptic camera as described herein may capture images at higher resolution than conventional plenoptic cameras as illustrated in FIGS. 3 and 4.

While embodiments of the methods for optimizing depth of field are described in relation to plenoptic cameras, the methods may be applied to small imaging devices in general, and thus may be applied to design and implement various other imaging devices used in microscopy, telescopes, infrared imaging, photography, and so on.

Two Modes of Focusing of the Plenoptic Camera

The plenoptic camera may be considered as a relay system, where the main lens creates a main image in the air, and this main image is remapped to the sensor by the microlens array. Depending on where the microlens array is located relative to the main image, there are two different modes of work of the relay system: the Keplerian telescopic mode, and the Galilean telescopic mode.

Keplerian Telescopic Mode

Figure 5:
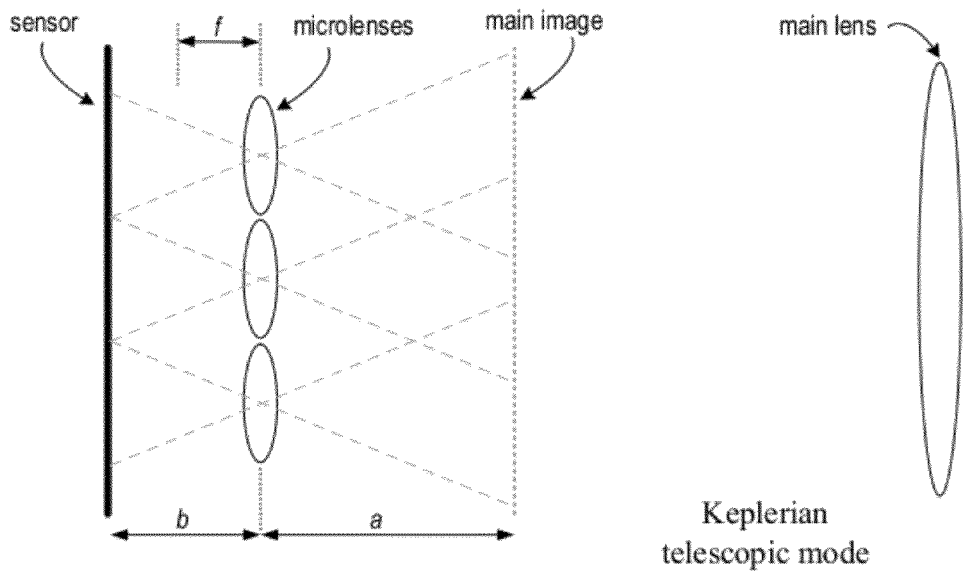
FIG. 5 illustrates microlens imaging in Keplerian mode (the Keplerian telescopic case) according to some embodiments.

In the Keplerian telescopic mode, the main image is formed in front of the microlens array. If the distance from the microlenses to the main image is a, and the distance from the microlenses to the sensor is b, a perfectly focused system satisfies the lens equation:

$$\frac{1}{a} + \frac{1}{b} = \frac{1}{f}$$

where f is the focal length of the microlens. See, for example, FIG. 5, which illustrates microlens imaging in Keplerian telescopic mode. In the illustration of FIG. 5, the main lens forms a main image in front of the microlenses. Note that the dimensions and relative distances of the components in this illustration are intended for illustrative purposes, and are not necessarily accurate.

The following equation may be defined as the inverse magnification:

$$M = \frac{a}{b} \quad (1)$$

It may be observed that inverse magnification M needs to satisfy M>2 because each point needs to be imaged by at least two different microlenses in order to have stereo parallax information captured. Substituting a from equation (1) into the lens equation produces:

$$b = \frac{M+1}{M} f \quad (2)$$

It can be seen that the distance b from the microlens to the sensor is required to be in the range:

$$f \le b < \frac{3}{2} f \quad (3)$$

Galilean Telescopic Mode

Figure 6:
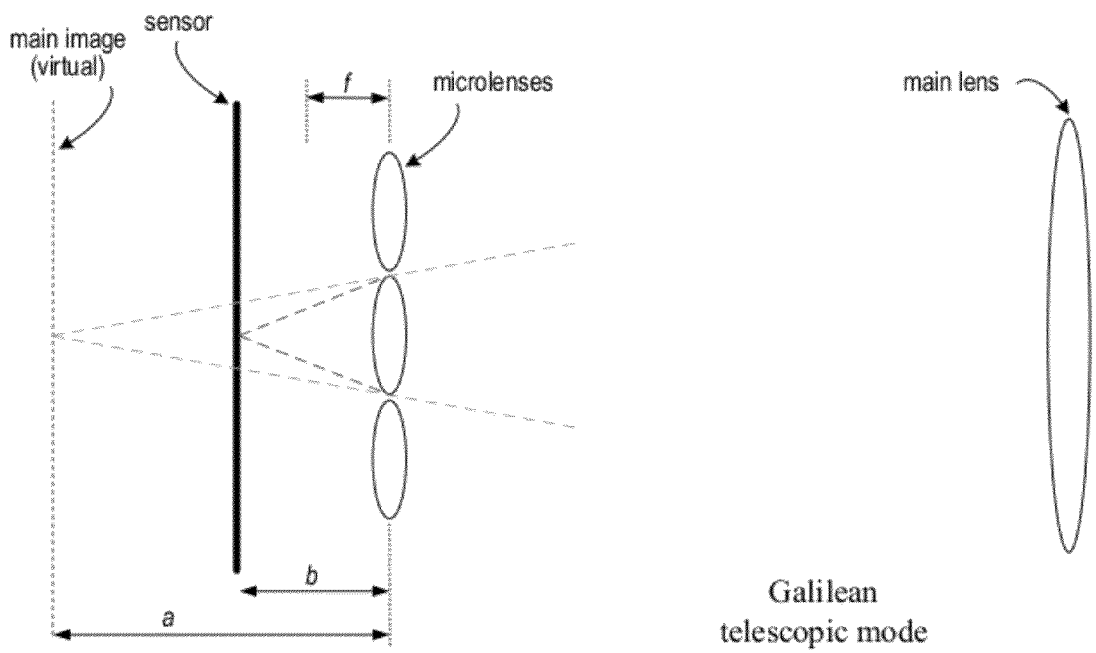
FIG. 6 illustrates microlens imaging in Galilean mode (the Galilean telescopic case) according to some embodiments.

When the main lens is focused to form an image behind the sensor, this image can be treated as virtual, and can still be focused onto the sensor. In this case, the distance a in the lens equation would be with negative sign. The definition (1) and the requirement M>2 remain the same. The imaging geometry for the Galilean telescopic case is shown in FIG. 6, which illustrates microlens imaging in a Galilean camera. Only rays through one microlens are shown. Note that the dimensions and relative distances of the components in this illustration are intended for illustrative purposes, and are not necessarily accurate.

In place of equations (2) and (3), the following equations are derived:

$$b = \frac{M-1}{M} f \quad (4)$$

$$\frac{f}{2} < b \le f \quad (5)$$

Figure 7:
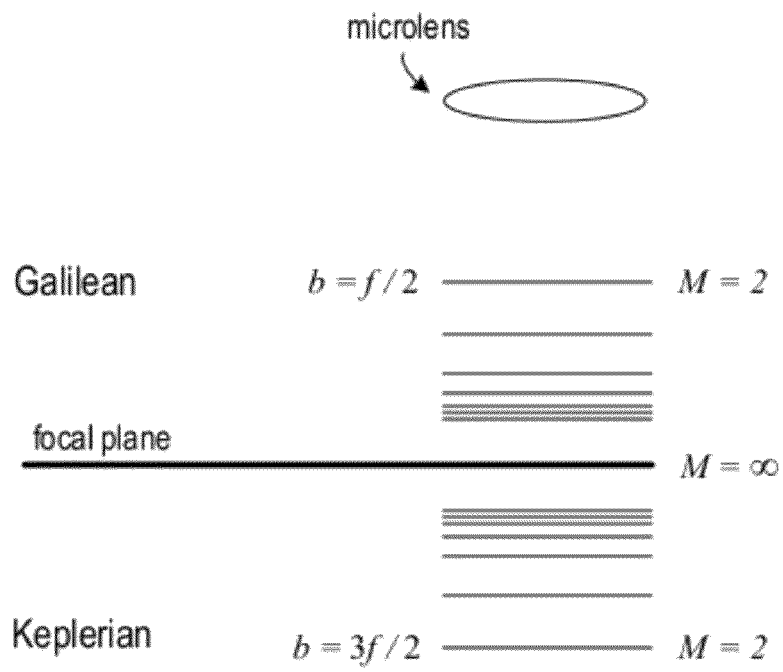
FIG. 7 illustrates locations behind a microlens where in focus images are formed for different magnifications for both the Keplerian telescopic and the Galilean telescopic case, according to some embodiments.

Both the Keplerian telescopic case and the Galilean telescopic case are represented in FIG. 7, which illustrates locations behind a microlens where in focus images are formed for different magnifications, according to equations (2) and (4). Horizontal lines represent integer values of M starting from 2 and increasing to infinity when approaching the focal plane from both sides. These are the locations behind the lens where perfectly in-focus images of inverse magnification M are formed, according to equations (2) and (4).

In conventional plenoptic cameras (see, e.g., FIGS. 3 and 4), the sensor is placed at the focal plane. FIG. 7 shows locations where the sensor may be placed in the two modes (Keplerian telescopic and Galilean telescopic) of embodiments of plenoptic cameras as described herein for different values of M, if the image is perfectly focused.

Depth of Field

It is known that a camera image is in focus within a range of distances from the lens, called depth of field. At any distance beyond that range, the image is defocused, and can be described by its blur radius. A digital image may be considered to be in focus if this blur radius is smaller than the pixel size p. The depth of field x is related to aperture diameter D, which may be expressed in terms of the F-number, F=b/D, by the following relation:

$$x = pF \quad \text{le;2q(6)}$$

Figure 8:
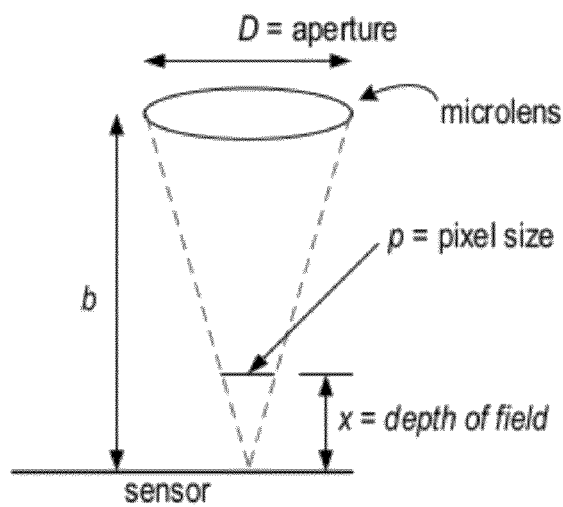
FIG. 8 illustrates the observation that, if the camera is in focus, depth of field is related to pixel size.

This can be derived considering similar triangles, as shown in FIG. 8. In FIG. 8, if the camera is in focus, depth of field is related to pixel size. Using equations (2) and (4), it may be verified that in both cases, if the sensor is placed at distance f from the microlenses (i.e., at the focal plane of the microlenses), the depth of field $$x = |b-f|$$

would satisfy:

$$M = \frac{f}{x} \quad (7)$$

As an example of how equations (6) and (7) may be used, consider the conventional plenoptic camera 102 of FIGS. 3 and 4. For this conventional plenoptic camera, the sensor is placed at the focal plane of the microlenses. In this implementation, the parameters are p=9µ, F=4, and f=500µ. Using equation (6), x=36µ is computed. In other words, the image is in focus within 36µ of the sensor, on both sides. Also, from equation (7) the inverse magnification M=14 is computed. This value of M, together with equations (1), (2) and (4), can be used to find the distances $a_K$ (for Keplerian telescopic) and $a_G$ (for Galilean telescopic) from the microlenses at which the main image must be located in the two cases (Keplerian telescopic and Galilean telescopic) so that it is in focus at the sensor.

$$a_K = (M+1)f \quad \text{le;2q(8)}$$

$$a_G = (M-1)f \quad \text{le;2q(9)}$$

It can be seen that, in the conventional plenoptic camera, within about 7 mm of the microlens array there is a zone of poor focus. However, anything outside that zone, and all the way to infinity, is perfectly in focus. This explains the observation that the same plenoptic camera can be used for both Galilean telescopic and Keplerian telescopic imaging. However, the zone of poor focus around the microlens array in the conventional plenoptic camera is quite large. Because of this limitation, it is impractical for conventional plenoptic cameras to be used in both Keplerian telescopic and Galilean telescopic imaging at the same time (that is, to capture a single image of a scene using both modes), since a large region of the scene would be in poor focus.

Effects of Wave Optics

Due to diffraction, the image blur p depends on the F-number. For a circular aperture:

$$p = 1.22 \lambda F \quad \text{le;2q(10)}$$

This can be used to compute optimal pixel size. Using equation (6) the following may be derived:

$$x = 1.22 \lambda F^2 \quad \text{le;2q(11)}$$

It may be observed that pixels are actually 3D voxels, having elongated shape that can be computed from wave optics.

Next, consider only 1D cameras (or square apertures) for simplicity. The circular aperture results differ only by a factor of 1.22:

$$p = \lambda F \quad (12)$$

$$x = \lambda F^2 \quad (13)$$

Substituting F from equation (12) into equation (6), gives $x=p^2/\lambda$, and using equation (7) a new formula is derived for the lowest M at which microlenses are still in focus:

$$M = \frac{\lambda f}{p^2} \quad (14)$$

The plenoptic camera may thus be modified, for example by adding apertures to the microlenses and sizing pixels appropriately, so that depth of field is increased. An inverse magnification and aperture diameter that are optimal for that purpose may be determined as follows. Assume p=9μ, f=500μ, and wavelength λ=0.5μ. From equation (14), inverse magnification M=~3 (instead of M=14, as in a conventional plenoptic camera), and from equation (12), F=18 (instead of F=4, as in a conventional plenoptic camera). Thus, apertures of appropriate size may be applied to the microlenses of the plenoptic camera to achieve the optimal values for M and F. Using these or similarly derived settings in a plenoptic camera, everything (i.e., all image planes, including image planes in both the Keplerian telescopic and the Galilean telescopic cases) not within ~1.5 mm of the microlenses is perfectly in focus. Embodiments of a plenoptic camera so implemented may work at the same time in both Keplerian telescopic and Galilean telescopic modes. In other words, embodiments of this plenoptic camera may capture an image that includes in-focus regions of both Keplerian telescopic and Galilean telescopic modes. Assuming a goal is refocusability of captured light-field images, everything in an image captured using embodiments of this plenoptic camera is fully refocusable, except for a relatively small 1.5 mm zone around the microlenses.

Note that changing one or more of p, f, and λ may result in different optimal values for M and F resulting from equations (12) and (14), and thus may require apertures of a different diameter.

Another interesting result may be obtained. The following relationship is found between the number of pixels N in a microimage and the size of a pixel p, assuming in-focus imaging in Galilean and Keplerian mode at the same time:

$$N = \frac{p}{\lambda} \quad (15)$$

To derive this, assume that the size of each microimage is half the focal length. This corresponds to main camera lens at F=2, which is realistic for most cameras. Then the number of pixels N in a microimage is $$N = \frac{f}{2p}.$$

Substituting in equation (14), $$M = \frac{2N\lambda}{p}.$$

Since the minimal value of M is 2, equation (15) may be obtained.

Multiplicity may be defined as the number of times a world point is seen in different microimages. Assuming a goal is to achieve lowest multiplicity and many pixels in individual microimages, larger pixels may be needed. However, sensors used in conventional plenoptic cameras have very small pixels, generally under 1μ. According to equation (15), if low multiplicity is necessary or desired, the microimage produced by such a conventional plenoptic camera would be only two pixels. This would not be optimal for embodiments of a combined Galilean telescopic and Keplerian telescopic plenoptic camera as described above that is everywhere in focus except for the small region around the microlenses.

Thus, contrary to common intuition, small pixels are not the solution that would produce large depth of field. The simple explanation is that small pixels require larger aperture in order to minimize diffraction, and larger aperture results in shallower depth of field. Considering equation (15), a method to achieve microimages of many pixels is to make those pixels large compared to the wavelength. For example, if pixel size is p=10μ, and λ=0.5μ, then N=20. Equation (14) yields a focal length for such a camera of f=400μ, (at M=2). The diameter of the apertures on the microlenses would be D=20μ. Note that the focal length and aperture diameter may be different for different pixel sizes and/or wavelengths.

Design Method

The above analysis and derived equations may be applied in a design methodology for achieving plenoptic cameras of large depth of field that may, for example, be used to capture light-field images in which the microimages of both Keplerian telescopic and Galilean telescopic modes are in focus. The design methodology may be implemented in software via which various parameters for plenoptic cameras can be entered other parameters may be calculated based on the entered values, and the values of the parameters may be automatically or manually adjusted to design plenoptic cameras with appropriate settings for the parameters so that depth of field is increased and both Keplerian telescopic and Galilean telescopic imaging can be realized. FIG. 9 is a flowchart of an example design method for designing such plenoptic cameras with large depth of field, according to some embodiments.

As indicated at 200 of FIG. 9, a pixel size p, a microlens focal length f, and a wavelength λ for a plenoptic camera may be obtained. Pixel size p may be determined according to equation (15):

$$N = \frac{p}{\lambda}$$

where N is the desired number of pixels in each microimage. Alternatively, a value for p may be used to calculate a value for N. As indicated at 202, a value for inverse magnification M may be calculated according to equation (14):

$$M = \frac{\lambda f}{p^2}$$

As indicated at 204, a value for microlens F-number F may be calculated according to equation (12):

$$p = \lambda F$$

As indicated at 206, a value for diameter D of apertures at the microlenses may be calculated according to M and F and the optical characteristics of the microlenses.

Alternatively, the design method may be used to determine values for various parameters starting from different initial parameters. For example, desired values for M and F, along with a value for wavelength λ, may be used to calculate values for pixel size p and microlens focal length f. In addition, values for one or more of the parameters may be adjusted to see the effects on the other parameters.

The results of the design method may be output as a plenoptic camera specification. FIG. 19 illustrates an example module that may implement embodiments of the design methodology as described herein, for example as illustrated in FIG. 9. FIG. 21 illustrates an example system on which such software may be executed.

EXAMPLE PLENOPTIC CAMERA EMBODIMENTS

Embodiments of a plenoptic camera may thus be designed and implemented according to the above equations and discussions with a goal of achieving refocusability and a larger depth of field. In these plenoptic cameras, both Keplerian and Galilean imaging can be realized at the same time. Some of these embodiments may include apertures for the microlenses to increase depth of field. In some embodiments, the inverse magnification M and F-number may be M=3 and F=18. However, it is to be noted that, in various embodiments, parameters including inverse magnification M, F-number F, aperture diameter D, pixel size p, focal length f, and depth of field x, may be at different values over appropriate ranges, with other parameters adjusted accordingly if necessary, while still achieving a large depth of field as described herein.

Figure 10:
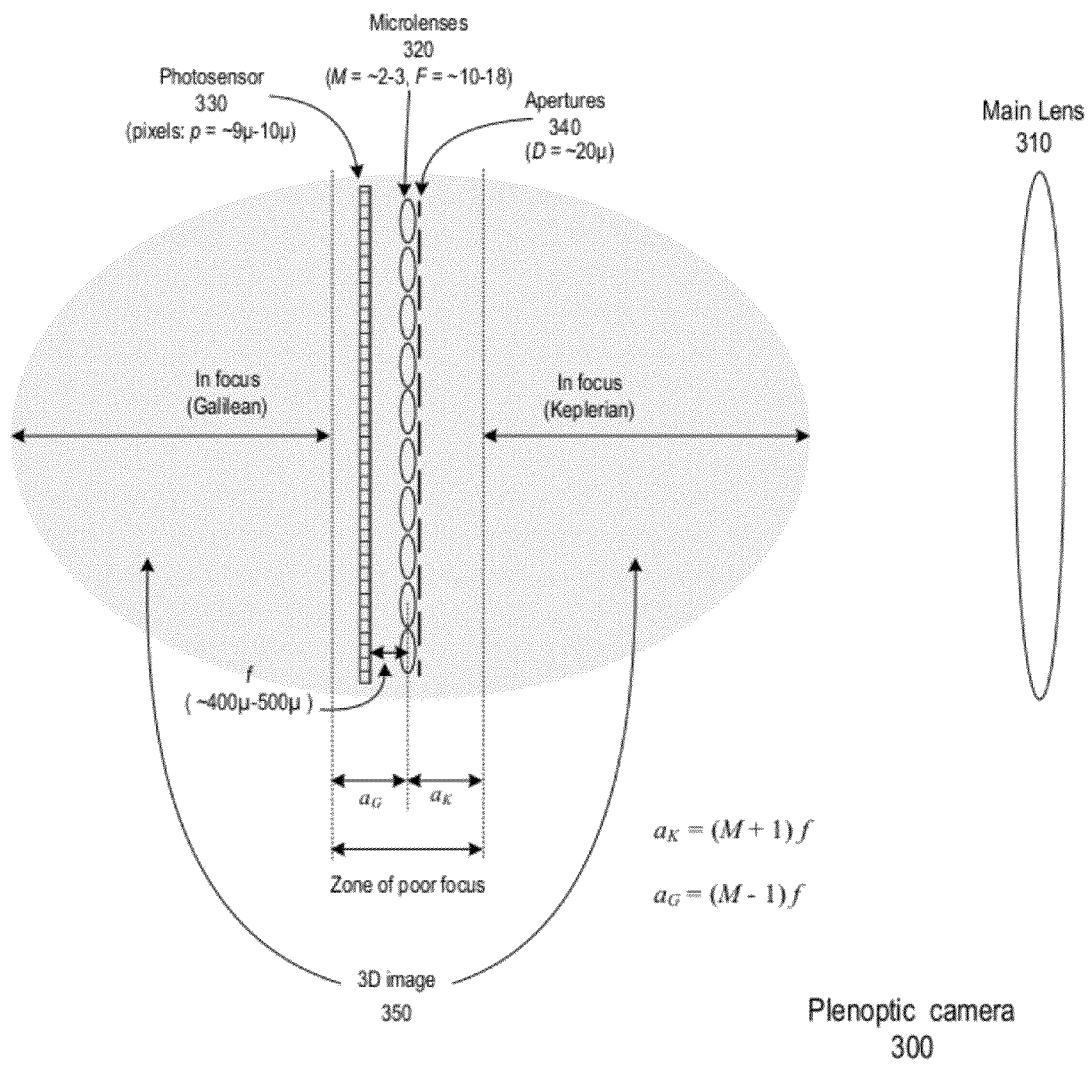
FIG. 10 illustrates an example plenoptic camera with large depth of field and in which both Keplerian and Galilean imaging may be realized at the same time, according to some embodiments.

FIG. 10 illustrates an example plenoptic camera with large depth of field and in which both Keplerian and Galilean imaging may be realized at the same time, according to some embodiments. Note that the numbers, dimensions and relative distances of the components in this illustration are intended for illustrative purposes, and are not necessarily accurate. Plenoptic camera 300 may include a main (objective) lens 310, an array of microlenses 320, and a photosensor 330. The microlenses 320 may be arranged at a distance f from the photosensor 330; for example, in some embodiments, f may be within a range of 400μ-500μ. Note that smaller or larger values for f may be used in other embodiments. Plenoptic camera 300 may also include apertures 340 of diameter D at the microlenses 320 that provide large depth of field for the plenoptic camera 300 as described herein. The array of microlenses 320 and the apertures 340 may be referred to as an optical element array, with each optical element in the optical element array including a microlens and a respective aperture for the microlens. For example, diameter D may be ~20μ, in some embodiments, and may produce an inverse magnification M=~2-3 and F=~10-18 for the optical elements according to the equations given herein, in some embodiments. Note that other values for D may be used in some embodiments. Different arrangements or dimensions of the elements, for example different values for diameter D, different optical characteristics for the microlenses 320, and/or different values for f may generate different values for M and/or F. In addition, the pixels p of the photosensor may be selected to be of an appropriately size to facilitate large depth of field as described herein; for example, the pixel size p may be within a range of 9μ-10μ. Note that larger or smaller pixel sizes may be used in some embodiments. The shaded ellipse 350 in FIG. 10 represents the 3D image of a real scene in front of the plenoptic camera 300 that is created by the main camera lens 310. The zone of poor focus represents a range in which image 350 is not in focus. The range extends distance $a_K$ in front of and distance $a_G$ behind microlenses 320. All of image 350 beyond distance $a_K$ in front of and $a_G$ behind the microlenses 320 is in focus. Distances $a_K$ and $a_G$ may be determined from inverse magnification M and focal length f of the optical elements in the optical element array according to equations 8 and 9, respectively. Thus, the values of $a_K$ and $a_G$ depend on the selection and arrangement of the various elements of plenoptic camera 300. For example, given M=2 and 500μ:

$$a_K = (2+1)(0.500) = 1.5 \text{ mm}$$

$$a_G = (2-1)(0.500) = 0.5 \text{ mm}$$

As another example, given M=3 and f=500μ:

$$a_K = (3+1)(0.500) = 2.0 \text{ mm}$$

$$a_G = (3-1)(0.500) = 1.0 \text{ mm}$$

Thus, the elements of a plenoptic camera 300 may be selected and arranged according to the design methodology described herein to provide large depth of field compared to conventional plenoptic cameras. Specifically, microlenses 320 and apertures 340 may be selected and arranged so that M is lower than in conventional plenoptic cameras (e.g., M=3 instead of M=14) and F is higher than in conventional plenoptic cameras (e.g., F=18 instead of F=4). In addition, pixels of larger size than in conventional plenoptic cameras may be used (e.g., p=~10μ).

For practical reasons, in addition to large depth of field, embodiments of such a plenoptic camera may need to have reasonable sensitivity to light (speed). Thus, in some embodiments, microlens apertures of about 2 times lower ("faster") F-number, for example F=10, may be used, instead of the theoretically optimal F=18. Variations on these settings are possible and contemplated.

Figure 11:
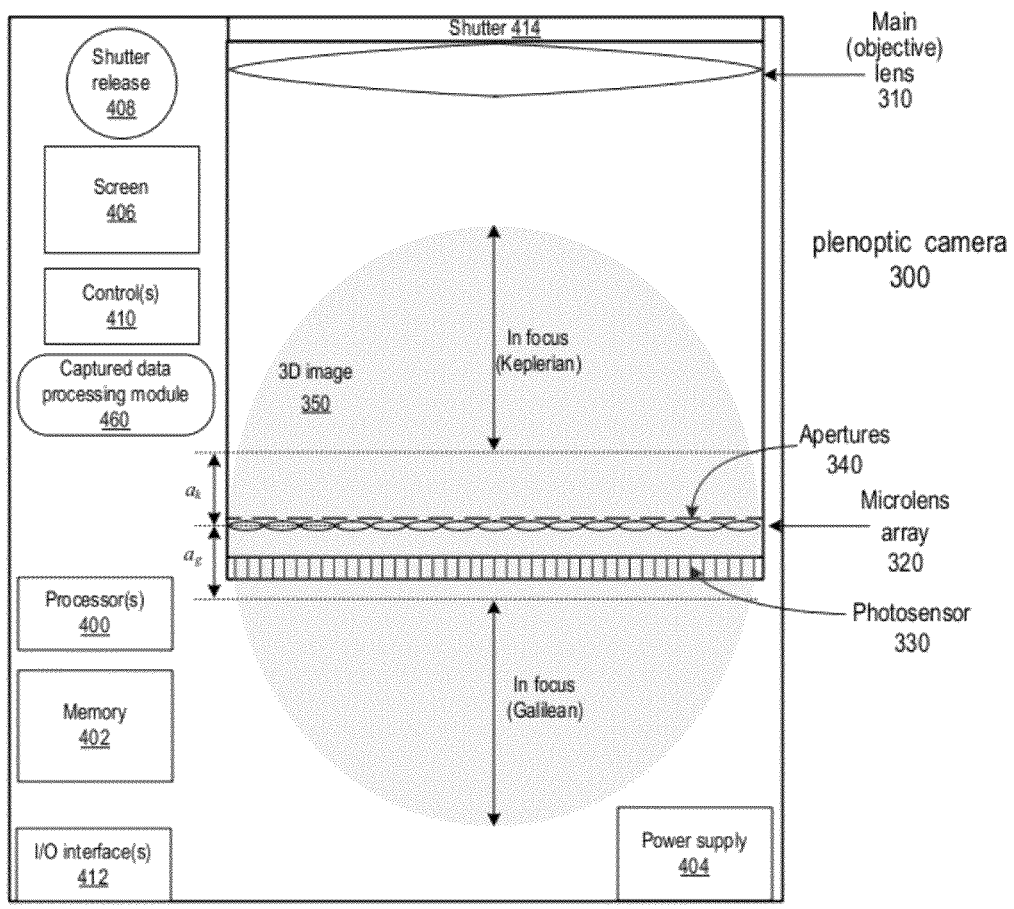
FIG. 11 illustrates an example embodiment of a plenoptic camera with various other elements that may be integrated in the camera, according to some embodiments.

FIG. 11 illustrates an example embodiment of a plenoptic camera 300 as illustrated in FIG. 10 with various other elements that may be integrated in the camera 300. In some embodiments of plenoptic camera 300, the objective lens 310, the microlens array 320, and the photosensor 330 may be fixed. In other embodiments, one or more of the above elements may be replaceable and/or adjustable. In some embodiments, photosensor 330 may be conventional film; in other embodiments, photosensor 330 may be a device for digitally capturing light, for example a CCD. In general, embodiments of a plenoptic camera 300 as described herein may include, in addition to main lens 310, microlens array 320, and photosensor 330, any other type of elements and features commonly found in digital cameras or other cameras including light-field and plenoptic cameras and large-format film cameras, and may also include additional elements and features not generally found in conventional cameras.

Figure 18:
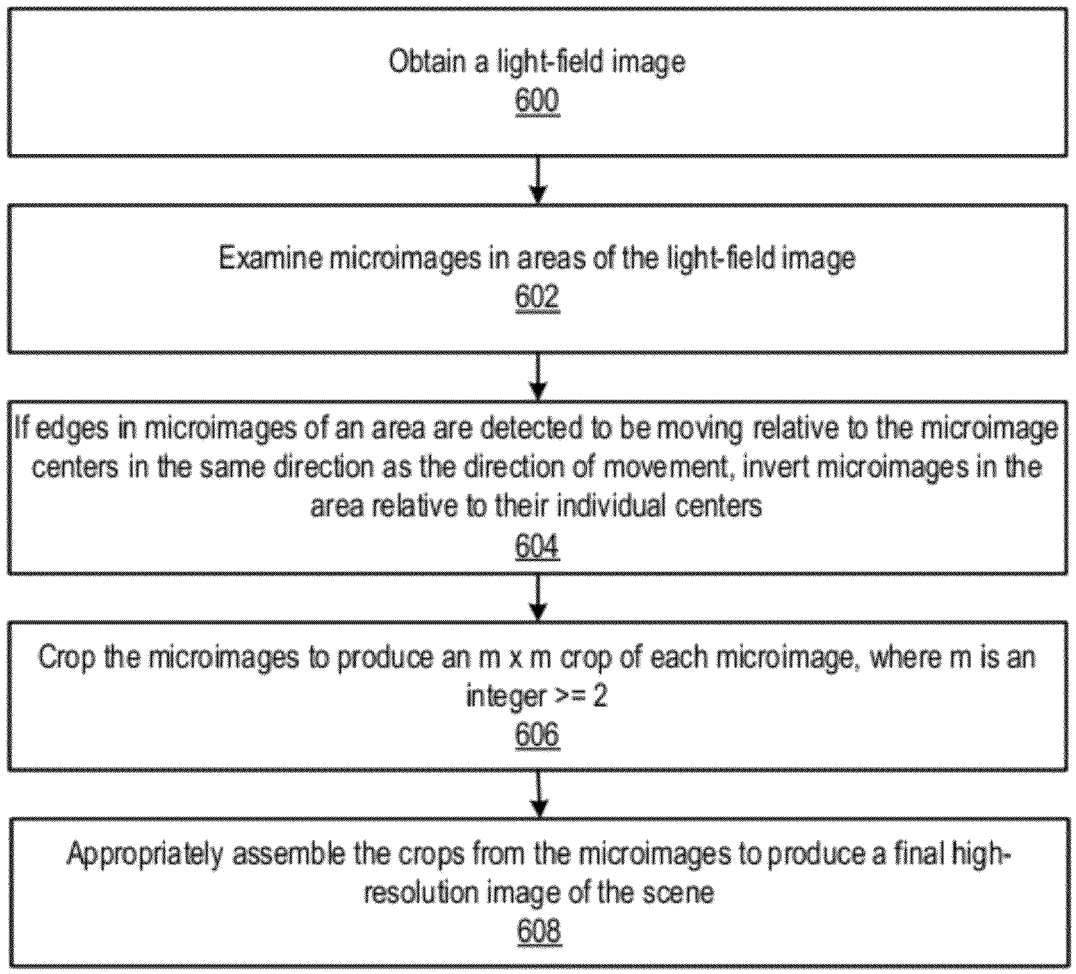
FIG. 18 is a flowchart of a light-field rendering method according to some embodiments.
Figure 20:
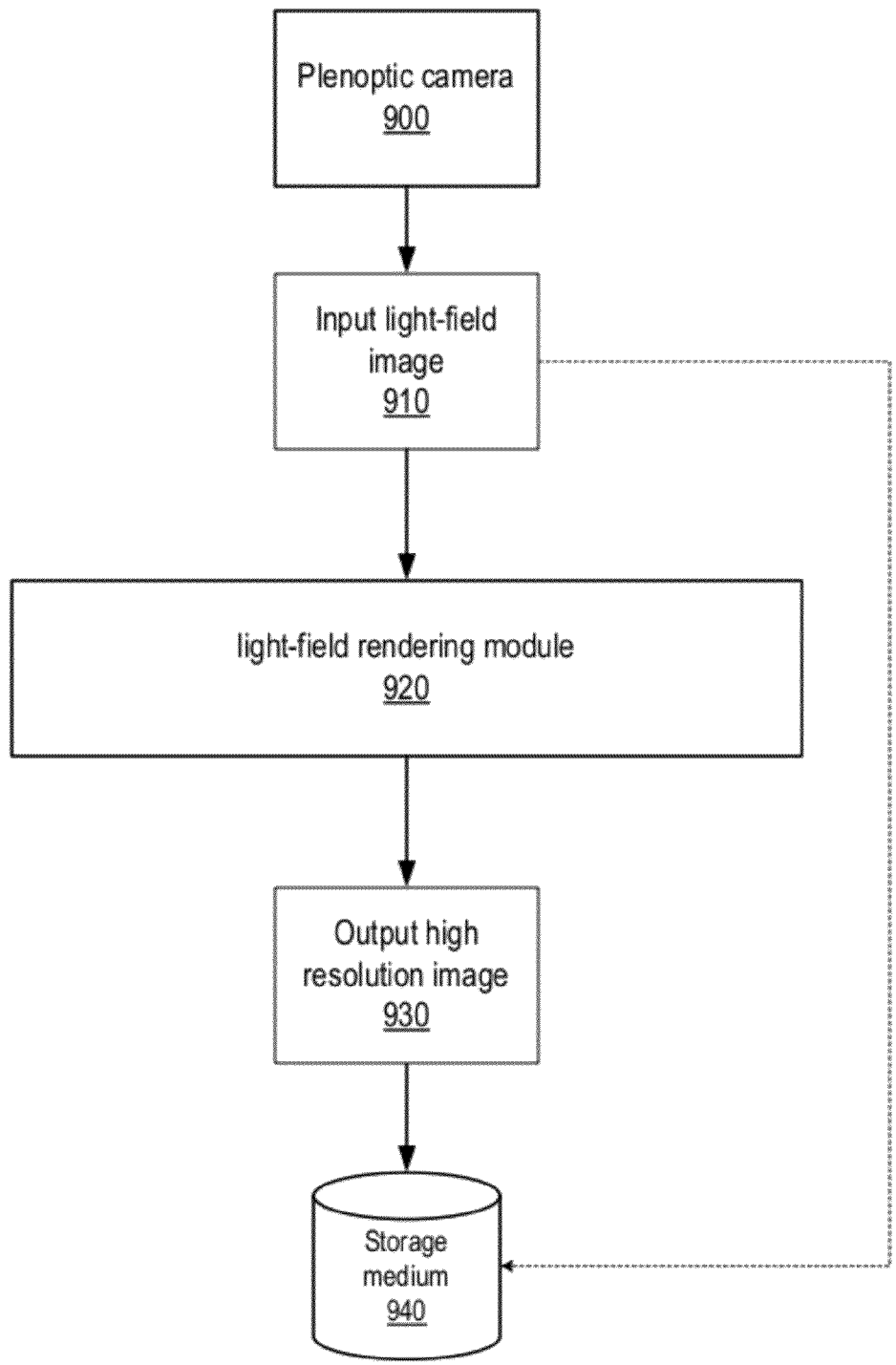
FIG. 20 illustrates a full-resolution light-field rendering module rendering a high-resolution image from a light-field captured, for example, by an embodiment of a plenoptic camera as described herein.

In some embodiments, a light-field rendering method for rendering high-resolution images from light-fields captured by plenoptic camera 300, and/or other image processing algorithms for application to light-fields captured by embodiments of plenoptic camera 300, may be implemented in captured data processing module 460. Captured data processing module 460 may be implemented in hardware, software, or a combination thereof. Alternatively, light-fields captured by plenoptic camera 300 may be rendered according to a light-field rendering method implemented in a light-field rendering module executing on a separate device, e.g. a computer system, to generate one or more high-resolution output images of a captured scene, as described herein. An example light-field rendering method that may be used to render light-field images captured by plenoptic cameras as described herein is illustrated in FIG. 18. An example module that may implement the method as shown in FIG. 18 is illustrated in FIG. 20. An example computer system in which embodiments of the light-field rendering method may be implemented is illustrated in FIG. 21.

A plenoptic camera 300 may include a shutter 414. Shutter 414 may be located in front of or behind objective lens 410. A plenoptic camera 300 may include one or more processors 400. A plenoptic camera 300 may include a power supply or power source 404, such as one or more replaceable or rechargeable batteries. A plenoptic camera 300 may include a memory storage device or system 402 for storing captured light-field images and/or rendered final images or other information such as software. In one embodiment, the memory 402 may be a removable/swappable storage device such as a memory stick. A plenoptic camera 300 may include a screen 406 (e.g., an LCD screen) for viewing scenes in front of the camera prior to capture and/or for viewing previously captured and/or rendered images. The screen 406 may also be used to display one or more menus or other information to the user. A plenoptic camera 300 may include one or more I/O interfaces 412, such as FireWire or Universal Serial Bus (USB) interfaces, for transferring information, e.g. captured light-field images, software updates, and so on, to and from external devices such as computer systems or even other cameras. A plenoptic camera 300 may include a shutter release 408 that is activated to capture a light-field image of a subject or scene, for example according to the method as shown in FIG. 12.

A plenoptic camera 300 may include one or more controls 410, for example controls for controlling optical aspects of the plenoptic camera 300 such as shutter speed, one or more controls for viewing and otherwise managing and manipulating captured images stored in a memory on the camera, etc.

Figure 12:
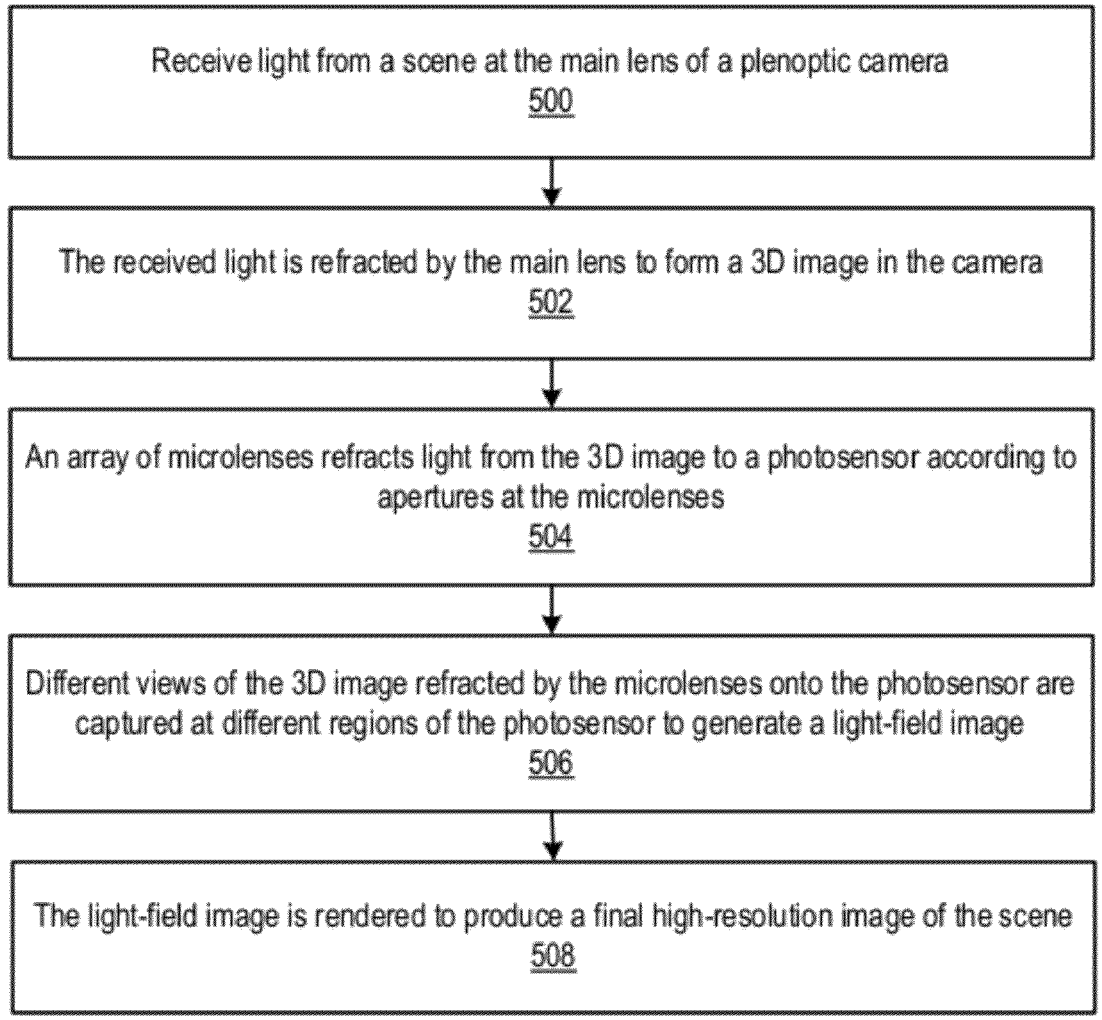
FIG. 12 is a flow chart illustrating how light is directed within a plenoptic camera according to some embodiments.

FIG. 12 is a flow chart illustrating how light is directed within a plenoptic camera according to some embodiments. As indicated at 500, light from a scene is received at the main lens of a plenoptic camera. FIGS. 10 and 11 illustrate example plenoptic cameras. As indicated at 502, the received light is refracted by the main lens to form a 3D image within the camera. As indicated at 504, an array of microlenses refracts light from the 3D image onto a photosensor located behind the array of microlenses. Apertures at the microlenses act to increase depth of field of the plenoptic camera. As indicated at 506, different views of the image plane, refracted by the microlenses onto the photosensor, are captured at different regions of the photosensor to generate a light-field image. In some embodiments, the photosensor may be a device configured to digitally capture light such as a CCD, while in other embodiments the photosensor may be conventional film. As indicated at 508, the captured light-field image may be rendered to produce a final high-resolution image, or images, of the scene, for example using a light-field rendering method as described in FIG. 18. For light-field images captured on conventional film, the light-field image may be digitized to generate a digitized light-field image before rendering.

Example Results

Figure 13:
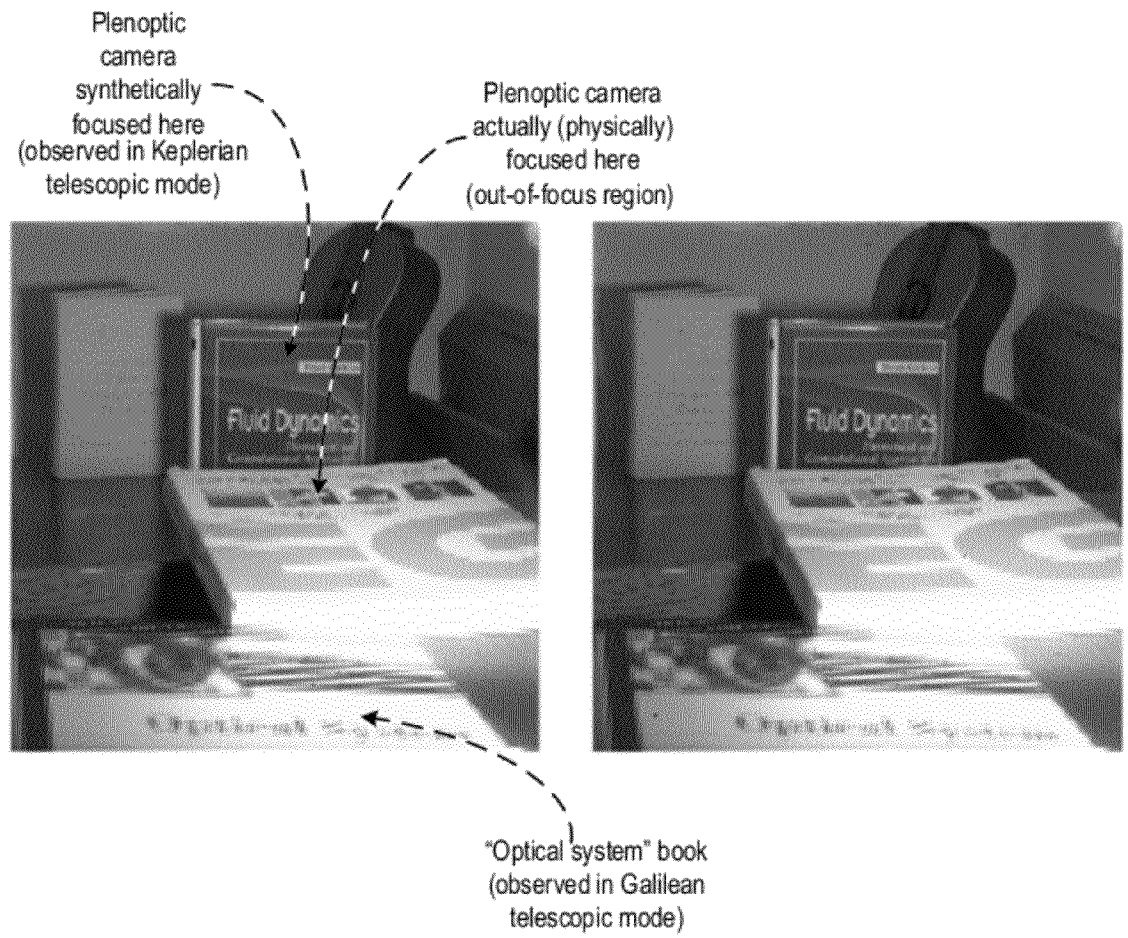
FIGS. 13 through 16 show example images or portions of images captured with an embodiment of a plenoptic camera as described herein.

FIGS. 13 through 16 show example images or portions of images captured with an embodiment of the plenoptic camera as described above. FIG. 13 shows a crossed eye stereo view. Two stereo views of a captured scene may be generated, as illustrated in FIG. 13. The plenoptic camera is synthetically focused on the "Fluid Dynamics" book. The stereo views may be synthetically generated (and synthetically focused) from the main image inside the plenoptic camera, observed through the microlens array. In this particular case, the "Optical System" book is mapped behind the microlenses as a virtual image, and is observed in Galilean mode. In FIG. 13, the sharp imaging of the plenoptic camera system due to the large depth of field may be observed.

Figure 14:
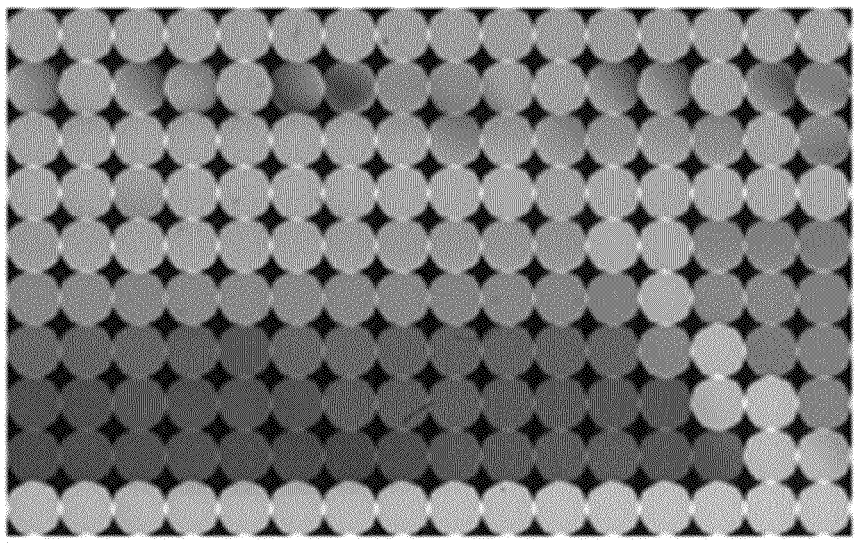
Figure 15:
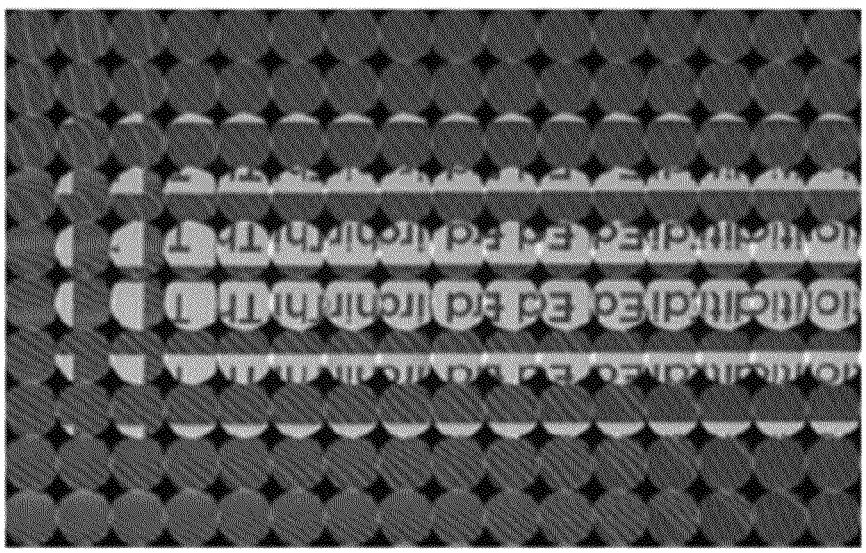
Figure 16:
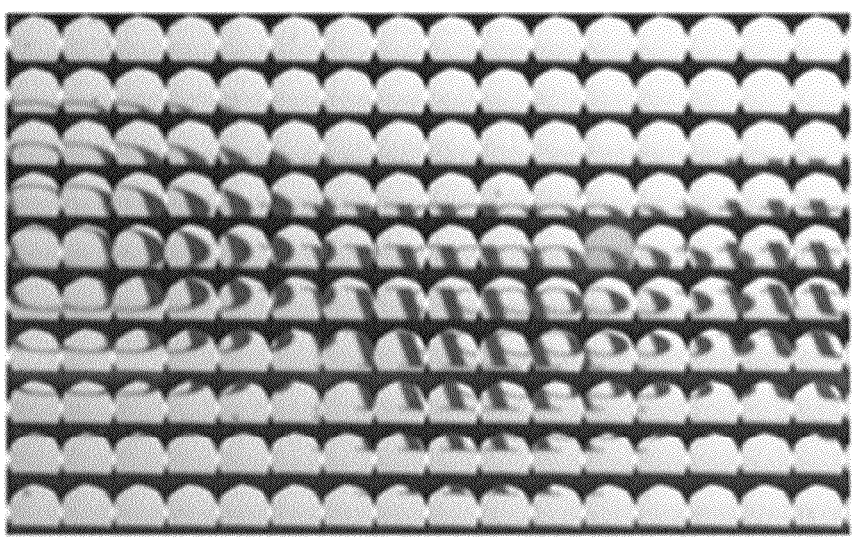

In capturing the example images of FIGS. 13 through 16, the plenoptic camera was physically focused exactly on the text at the top of the "EG" book. This means that the main image of this area falls in the zone of poor focus within 1.5-2 mm from the microlenses. Some of the microimages from this region are shown in FIG. 14, which shows out of focus microimages at the top of the EG book. In the main image inside the plenoptic camera, the "Fluid Dynamics" book is mapped in front of the microlenses, and is thus mapped to the sensor in Keplerian telescopic mode, and thus, while the microimages are in focus, the microimages are inverted, as shown in FIG. 15. FIG. 16 illustrates Galilean telescopic imaging, showing some of the microimages from the region of the "Optical system" book. The microimages are in focus; part of the text "Optical" is repetitively imaged and not inverted in each microimage.

Figure 17A:
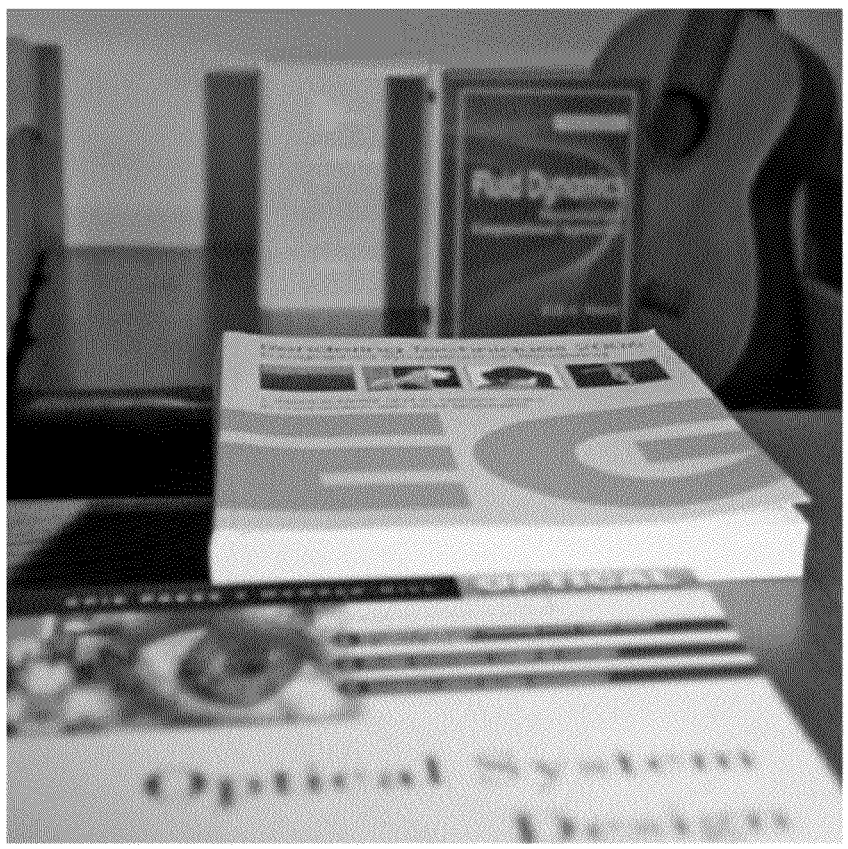
FIGS. 17A and 17B compare an example image of a scene captured with a conventional camera to an example image of a similar scene captured with an embodiment of a plenoptic camera after the captured light-field image has been rendered as described herein.

FIGS. 17A and 17B compare an example image of a scene captured with a conventional camera (FIG. 17A) to an example image of a similar scene captured with an embodiment of the plenoptic camera as described above (FIG. 17B). The image shown in FIG. 17B has been processed using a light-field rendering method, for example as shown in FIG. 18. For the "raw" image from which this image was produced, the plenoptic camera was physically focused on the "EG" book. This means that the main image of this area falls in the region of bad focusing within a range of about 1.5 to 2 mm from the microlenses. In the conventional image of FIG. 17A, the camera is also focused on the "EG" book; note that the foreground and background are out-of-focus. In contrast, in the image of FIG. 17B, the foreground and background are in focus.

Full-Resolution Light-Field Rendering Method

A method for rendering high-resolution images from a light-field, for example captured by embodiments of the plenoptic camera as described herein, is described. The method may be referred to as a full-resolution light-field rendering method, or simply as a light-field rendering method. The light-field rendering method may be referred to as full-resolution because the method makes full use of both positional and angular information available in the captured radiance data. The light-field rendering method may be implemented as or in a tool, module, library function, plug-in, stand-alone application, etc. For simplicity, implementations of embodiments of the light-field rendering method may referred to as a light-field rendering module. Alternatively, or in addition, other light-field rendering or processing techniques may be applied to captured light-field images by a light-field rendering module, and/or by other modules. FIG. 21 illustrates an example computer system on which embodiments of a light-field rendering module may be implemented.

Two distinct behaviors (Keplerian telescopic and Galilean telescopic) are described above, and embodiments of the light-field rendering method may execute a different action based on which behavior is observed in the microimages contained in a light-field image captured by an embodiment of a plenoptic camera as described herein, for example as illustrated in FIG. 11. In one embodiment, if the light-field rendering method detects edges (or features) moving relative to the microimage centers (the microimages are generally circular, so may be referred to as circles) in the same direction as the direction of movement, all microimages in that area are inverted relative to their individual centers (this is the Keplerian telescopic case). If the light-field rendering method detects edges moving relative to the microimage centers in a direction opposite to the direction of movement, the method does nothing (this is the Galilean telescopic, or binocular, case). In some embodiments, examination of the microimages to determine the direction of movement of edges may be performed by a user via a user interface. The user may mark or otherwise indicate areas that the user determines need be inverted via the user interface. In some embodiments, examination of the microimages to determine the direction of movement of edges may be performed automatically in software.

The small circles, or microimages, in a light-field image are, effectively, puzzle pieces of the big image, and embodiments of the light-field rendering method may reproduce the big image by bringing the microimages sufficiently close together. The big image may alternatively be reproduced by enlarging the pieces so that features from any given piece match those of adjacent pieces. Assembling the resized pieces reproduces exactly the high-resolution image.

In either of these approaches, the individual pieces may overlap. Some embodiments of a light-field rendering method may avoid this overlapping by dropping all pixels outside a square of size m, effectively cropping the microimage to an m×m square. Note that other embodiments may crop to other geometric shapes, such as a rectangle.

Figure 17B:
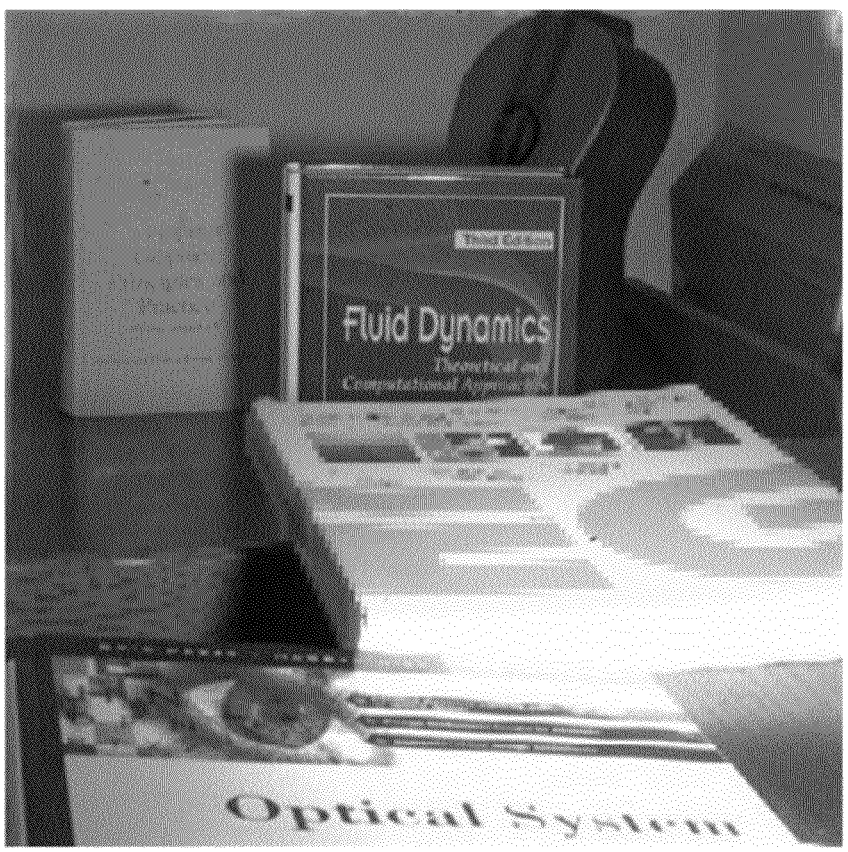

Conventional rendering methods do not reassemble pixels as described above; the conventional plenoptic camera algorithm produces one pixel per microlens for the output image. Embodiments of the light-field rendering method described herein, using the algorithm described above, may produce a gain in resolution that is approximately equal to the number of pixels m in the original patches. That is, embodiments produce m×m pixels, or $m^2$ pixels, instead of one pixel, per microimage FIG. 18 is a flowchart of a full-resolution light-field rendering method according to one embodiment. As indicated at 600, a light-field image captured by a plenoptic camera may be obtained (see, e.g., FIGS. 14 through 16 for examples of what portions of such a light-field image may look like to a human observer). As indicated at 602, microimages in areas of the light-field image may be examined to determine the direction of movement of edges in the microimages relative to a direction of movement of the algorithm. At 604 if it is determined that edges in microimages of an area are moving relative to the microimage centers in the same direction as the direction of movement, the microimages in that area may be inverted relative to their individual centers. As indicated at 606, the microimages may each be cropped to produce an m×m subregion or crop of each microimage, where m is an integer greater than two. As indicated at 608, the subregions or crops from the microimages may be appropriately assembled to produce a final high-resolution image of the scene. FIG. 17B illustrates an example final image that may be generated from a light-field image.

Plenoptic Camera Design Module Example Implementation

FIG. 19 is a simple block diagram illustrating a plenoptic camera design module for designing embodiments of plenoptic cameras with large depth of field that can capture images including both Keplerian telescopic and Galilean telescopic image data in a single image, with only a small region around the microlenses in poor focus. Plenoptic camera design module 720 may implement an embodiment of a design method as illustrated in FIG. 9. FIG. 21 illustrates an example computer system on which embodiments of plenoptic camera design module 720 may be implemented.

In some embodiments, plenoptic camera design module 720 may provide a user interface that provides user interface elements whereby a user may enter or specify one or more plenoptic camera parameters, such as pixel size p, microlens focal length f, wavelength λ, inverse magnification M, and microlens F-number F. Based on the specified parameters, the module 720 may calculate and display other plenoptic camera parameters according to the equations provided herein, for example as shown in FIG. 9.

Light-Field Rendering Module Example Implementation

FIG. 20 illustrates a full-resolution light-field rendering module rendering a high-resolution image from a light-field captured, for example, by a plenoptic camera, according to some embodiments. Light-field rendering module 920 may implement a full-resolution light-field rendering method as described in FIG. 18. FIG. 21 illustrates an example computer system on which embodiments of light-field rendering module 920 may be implemented. In some embodiments of a plenoptic camera, light-field rendering module 920 may be implemented in the camera, e.g. in captured data processing module 460 of plenoptic camera 300 as illustrated in FIG. 11. Referring to FIG. 20, light-field rendering module 920 receives an input light-field image 910 captured by a plenoptic camera 900, such as one of the embodiments of plenoptic cameras described herein, e.g. plenoptic camera 300 as illustrated in FIGS. 10 and 11. Example portions of light-field images as may be captured by an example embodiment of a plenoptic camera are illustrated in FIGS. 14 through 16. Light-field rendering module 920 then processes the input image 910 according to a light-field rendering method as described herein, for example in reference to FIG. 18. Light-field rendering module 920 generates as output a high-resolution image 930. FIG. 17B illustrates an example high-resolution images that may be rendered and output by light-field rendering module 920. Output image 930 may, for example, be stored to a storage medium 940, such as system memory, a disk drive, DVD, CD, etc. The dashed line from input image 910 to storage medium 940 indicates that the original (input) light-field image 910 may also be stored.

Example System

Embodiments of a plenoptic camera design module and/or a light-field rendering module as described herein may be executed on one or more computer systems, which may interact with various other devices. One such computer system is illustrated by FIG. 21. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system

1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of plenoptic camera design module and/or a light-field rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 21, memory 1020 may include program instructions 1025, configured to implement embodiments of a plenoptic camera design module and/or a light-field rendering module as described herein, and data storage 1035, comprising various data accessible by program instructions 1025. In one embodiment, program instructions 1025 may include software elements of embodiments of a plenoptic camera design module and/or a light-field rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a plenoptic camera design module and/or a light-field rendering module described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An imaging device, comprising:
a photosensor that captures light projected onto the photosensor;
an objective lens, wherein the objective lens that refracts light from a scene located in front of the imaging device to form a three-dimensional (3D) image of the scene in the imaging device;
an optical element array positioned between the objective lens and the photosensor, wherein the optical element array comprises a plurality of optical elements, and wherein each optical element in the optical element array comprises:
a microlens; and
an aperture that increases depth of field of the microlens;
wherein the 3D image of the scene extends in front of and behind the optical element array, wherein each optical element of the optical element array projects a separate portion of the 3D image of the scene onto a separate location on the photosensor, and wherein the separate portions of the 3D image projected onto the photosensor by the optical elements are in focus except for portions projected onto the photosensor from within a range extending in front of and behind the microlenses in the optical element array.

2. The imaging device as recited in claim 1, where the range is determined according to inverse magnification M and focal length f of the microlenses.

3. The imaging device as recited in claim 1, where the microlenses are at distance f from the photosensor, where f is focal length of the microlenses.

4. The imaging device as recited in claim 1, where pixel size p of pixels in the photosensor is determined according to number of pixels N in each microimage captured by the imaging device and wavelength of light $\lambda$.

5. The imaging device as recited in claim 1, where the optical elements are configured to obtain an inverse magnification M, where M is determined according to pixel size p of pixels in the photosensor, focal length f of the microlenses, and wavelength of light $\lambda$.

6. The imaging device as recited in claim 1, where the optical elements are configured to obtain an F-number F for the microlenses according to pixel size p of pixels in the photosensor and wavelength of light $\lambda$.

7. The imaging device as recited in claim 1, wherein the photosensor comprises a plurality of pixels of size p, where p is determined according to wavelength of light $\lambda$ and F-number F of the microlenses.

8. The imaging device as recited in claim 1, wherein the photosensor is configured to capture a light-field image comprising the separate portions of the image of the scene projected onto the photosensor by the microlenses, wherein each of the separate portions is in a separate region of the light-field image.

9. A method for capturing light-field images, comprising:
receiving light from a scene at an objective lens of an imaging device;
refracting light from the objective lens of the imaging device to form a 3D image of the scene within the imaging device;
receiving light from the 3D image at an array positioned between the objective lens and a photosensor of the imaging device, wherein the array comprises a plurality of microlenses, and wherein the array further comprises a plurality of apertures, wherein each aperture corresponds to a particular one of the microlenses in the array, and wherein each aperture increases depth of field of a respective microlens;
receiving light from the array at the photosensor, wherein the photosensor receives a separate portion of the 3D image of the scene from each microlens at a separate location on the photosensor; and
wherein the 3D image of the scene extends in front of and behind the optical element array, and wherein the separate portions of the 3D image projected onto the photosensor are in focus except for portions projected onto the photosensor from within a range extending in front of and behind the microlenses in the array.

10. The method as recited in claim 9, where the range is determined according to inverse magnification M and focal length f of the microlenses.

11. The method as recited in claim 9, where the microlenses are at distance f from the photosensor, where f is focal length of the microlenses.

12. The method as recited in claim 9, where pixel size p of pixels in the photosensor is determined according to number of pixels N in each microimage captured by the imaging device and wavelength of light $\lambda$.

13. The method as recited in claim 9, where the imaging device is configured to obtain an inverse magnification M for the microlenses, where M is determined according to pixel size p of pixels in the photosensor, focal length f of the microlenses, and wavelength of light $\lambda$.

14. The method as recited in claim 9, where the imaging device is configured to obtain an F-number F for the microlenses according to pixel size p of pixels in the photosensor and wavelength of light $\lambda$.

15. The method as recited in claim 9, wherein the photosensor comprises a plurality of pixels of size p, where p is determined according to wavelength of light $\lambda$ and F-number F of the microlenses.

16. An optical imaging system, comprising:
an objective lens, wherein the objective lens is configured to refract light from a scene located in front of the optical imaging system to form a three-dimensional (3D) image of the scene behind the objective lens; and
an optical element array, wherein the 3D image of the scene extends in front of and behind the optical element array;
wherein the optical element array comprises a plurality of optical elements, wherein each optical element of the optical element array is configured to project a respective portion of the 3D image of the scene onto a respective location on a photosensor, wherein the respective portions of the 3D image of the scene projected onto the photosensor include portions of the 3D image from in front of the optical element array and portions of the 3D image from behind the optical element array; and
wherein the optical elements are configured to obtain an inverse magnification M between 2 and 3 to produce a depth of field for the optical imaging system such that respective portions of the 3D image projected onto the photosensor by the optical elements are in focus except for portions projected onto the photosensor from within a range extending in front of and behind the optical element array, wherein the range is determined according to the inverse magnification M.

17. The optical imaging system as recited in claim 16, wherein each optical element in the optical element array comprises a microlens and an aperture, wherein the aperture affects optical characteristics of the respective microlens to obtain the inverse magnification M of between 2 and 3 for the optical element.

18. The optical imaging system as recited in claim 16, where the range is determined according to the inverse magnification M and focal length f of the optical elements.

19. The imaging device as recited in claim 16, where the inverse magnification M is determined according to pixel size p of pixels in the photosensor, focal length f of the microlenses, and wavelength of light $\lambda$.

20. The imaging device as recited in claim 16, where the optical imaging system is configured to obtain an F-number F for the optical elements according to pixel size p of pixels in the photosensor and wavelength of light $\lambda$.

21. The imaging device as recited in claim 20, wherein the obtained F-number F for the optical elements is between 10 and 18.

* * * * *